(12) United States Patent
Masa et al.

(10) Patent No.: US 12,072,217 B2
(45) Date of Patent: Aug. 27, 2024

(54) DETECTOR DEVICE, POSITIONING CODE AND POSITION DETECTING METHOD

(71) Applicant: PreciLabs SA, Onnens (CH)

(72) Inventors: Péter Masa, Onnens (CH); István Masa, Budapest (HU)

(73) Assignee: PreciLabs SA, Onnens (CH)

( * ) Notice: Subject to any disclaimer, the term of this patent is extended or adjusted under 35 U.S.C. 154(b) by 0 days.

(21) Appl. No.: 17/935,697

(22) Filed: Sep. 27, 2022

(65) Prior Publication Data

US 2023/0018034 A1 Jan. 19, 2023

Related U.S. Application Data

(63) Continuation of application No. 16/346,703, filed as application No. PCT/HU2017/000048 on Nov. 2, 2017, now Pat. No. 11,486,741.

(30) Foreign Application Priority Data

Nov. 2, 2016 (HU) .................................... P1600609
Feb. 10, 2017 (HU) .................................... P1700061

(51) Int. Cl.
*G01D 5/347* (2006.01)

(52) U.S. Cl.
CPC ................ *G01D 5/34776* (2013.01)

(58) Field of Classification Search
CPC ................................................ G01D 5/34776
See application file for complete search history.

(56) References Cited

U.S. PATENT DOCUMENTS

| 5,309,230 | A | * | 5/1994 | Blondel | H04N 25/711 |
| | | | | | 348/169 |
| 6,608,296 | B1 | * | 8/2003 | Toyoda | H04N 3/1575 |
| | | | | | 250/214 R |
| 8,022,895 | B2 | * | 9/2011 | Tsao | H04N 13/395 |
| | | | | | 345/55 |
| 2007/0194213 | A1 | * | 8/2007 | Augusto | H01L 27/1463 |
| | | | | | 250/214.1 |
| 2012/0039548 | A1 | * | 2/2012 | Wang | H04N 25/677 |
| | | | | | 382/312 |
| 2012/0326016 | A1 | * | 12/2012 | Ishizuka | G01D 5/34792 |
| | | | | | 250/231.1 |
| 2014/0097329 | A1 | * | 4/2014 | Wadsworth | G01J 1/44 |
| | | | | | 250/208.1 |
| 2017/0068879 | A1 | * | 3/2017 | Jordil | G06K 19/06018 |

* cited by examiner

*Primary Examiner* — Thanh Luu
*Assistant Examiner* — Monica T Taba
(74) *Attorney, Agent, or Firm* — Wood Herron & Evans LLP

(57) ABSTRACT

The invention relates to a detector device having pixels in a two-dimensional arrangement, the detector device comprising row pixels, a row readout wiring for each row of said row pixels and a column select wiring for each column of said row pixels, as well as column pixels, a column readout wiring for each column of said column pixels and a row select wiring for each row of said column pixels. Analog-to-digital converters adapted for row-parallel and column-parallel operation are connected to the readout wirings, and simultaneously one or more columns of row pixels for row parallel readout and one or more rows of column pixels for column parallel readout can be selected. The invention further relates to a positioning code and to a position detecting method.

10 Claims, 18 Drawing Sheets

DETECTOR DEVICE, POSITIONING CODE AND POSITION DETECTING METHOD

CROSS-REFERENCE TO RELATED APPLICATION

The present application is a divisional of co-pending U.S. application Ser. No. 16/346,703 filed May 1, 2019, the disclosure of which is incorporated by reference herein in its entirety.

TECHNICAL FIELD

The invention relates to a detector device, to a positioning code and to a position detecting method for high accuracy position detecting applications.

BACKGROUND ART

Pixel-based encoders offer several advantages over traditional optical encoders, such as higher resolution, higher accuracy, much more robustness, higher flexibility and the possibility of multi-dimensional 2D, 3D . . . 6D position measurements just to mention a few. While traditional optical encoders use only a few photoreceptors, pixel-based encoders use tens- or hundreds of thousands of photoreceptors (pixels). The large number of pixels allow pixel-based encoders to go beyond the fundamental limits of traditional encoders in terms of most important encoder specifications.

In the context of the present application, pixels may have any type of sensor elements (e.g. photon, electron, radiation, or e-beam sensor elements).

Prior art solutions use pixel-based encoders with two-dimensional positioning codes consisting of a two-dimensional regular (or in other word repetitive) pattern and an absolute positioning code which is interlaced with two-dimensional regular pattern. The absolute positioning code can be read for establishing the absolute code of the current position, while the two-dimensional regular pattern serves for enhancing resolution; the position of the two-dimensional regular pattern with respect to the pixel-arrangement of the encoder can be determined and thus the resolution highly enhanced. The combination of two, i.e. an absolute code and a code pattern position with respect to the two-dimensional arrangement of the pixels can be used together to measure precisely the absolute position of the positioning code with respect to the detector device. The regular pattern enables a high-spatial-resolution, short-range (local or non-absolute) measurement, while absolute positioning code enables a low-spatial-resolution, long-range (global or absolute) measurement. The basic idea of this prior art solutions is to combine the advantages of the two, thereby providing a combined code for high-spatial-resolution, long-range (global or absolute) measurement. Such solutions are disclosed e.g. in EP 2 169 357 B1, WO 2012/007561 A2, EP 2 546 612 A2 and EP 2 546 613 A2.

The disadvantages of the above prior art solutions are the following. As the absolute code occupies the space between the spacings of the regular pattern, this positioning code has a relatively low signal-to-noise ratio. Namely, position measurement of the two-dimensional regular pattern with respect to the pixel arrangement of the encoder starts with a horizontal and vertical summing of the pixel values (or averaging, which is considered an equivalent in the context of the present application), and in this way the 2D image is reduced to two vectors.

The position is then determined on the basis of the values of the two vectors. As the absolute code appears within the spacings, thereby lowers the accuracy of determining the position of the regular pattern. Another disadvantage is that the interlaced pattern results in a relatively "perforated" mask, the layout of which is hardly compatible with metal mask and other mask technologies. The minimum dimensions of separations between holes (pitch) impose limitations on the pattern and reduce precision and resolution.

In addition to finding a more favorable code pattern, the major challenge of pixel-based encoders with respect to traditional encoders is the speed, or latency of the encoder, because the computing and power needs to process a large number of pixels is orders of magnitudes beyond that of conventional encoders. Also, the attainable frame-rates of conventional image sensors are orders of magnitude below than needed for high-speed optical encoder applications. The reading of the absolute code and the detecting of the position of the pattern with respect to the pixel arrangement necessitates combined and complicated reading steps.

U.S. Pat. No. 7,193,197 B2 discloses a detection device enabling a combined reading of pixels, but this device enables accessing row-sums and column-sums of pixels only, and information carried by individual pixels is lost, thereby it is not suitable to read the absolute code. Namely, all pixels in a row are connected by one wiring and all pixels in a column are connected by one wiring. Connected/wired pixels become 'one long pixel', one electrical node, and the photo-current of all connected/wired pixels is summed up. Wiring makes it impossible to access/read-out individual pixels Image variations along the wirings are not detectable. In an M×N wired pixel array there are only M+N effective pixels: M long pixels in one dimension and N long pixels in the other dimension. In a typical example, M=N=256, M*N=256×256=65,536, M+N=256+256=512. Therefore, the wiring reduces the effective pixels from 65,536 to 512, only row-sums and column-sums can be accessed, information carried by individual pixels is lost. Furthermore, this known detection device only enables sequential read-out using its shift register, integrator, CDS, and A/D converter. With sequential read-out the reachable frame-rate is strongly reduced; 3.2 kHz is reported in many related publications, while a 100-times higher frame-rate is generally desired. Further detector devices are disclosed in U.S. Pat. No. 6,252,217 B1 and US 2014/0097329 A1.

DISCLOSURE OF INVENTION

There is a need to provide technical solutions enabling
simultaneous, row-parallel and column-parallel—preferably non-destructive—arbitrary read-out and binning of pixels,
both pixel-combined and pixel-targeted readout of a positioning code,
a random access of arbitrary pixels rather than hardwired sum of group of pixels,
a parallel readout rather than serial read-out,
a parallel processing rather than serial processing,
preferably measuring any rotation of the pattern and reading out a rotated code.

There is also a need to provide a positioning code resulting in a higher signal-to-noise ratio row-sum and column-sum and enabling the lowering of the pitch still being compatible with masking technologies.

The above objectives have been achieved by the detector device according to claim 1 and claim 8, by the positioning code according to claim 10 and by the position detecting method according to claim 17. Preferred embodiments are defined in the dependent claims.

The invention provides a detector device and a method to read out the pixel array at the highest possible speed, by introducing simultaneous row-wise and column-wise parallelism, to calculate row-sums (or row-mean), column-sums (or column-mean) and to facilitate fast decoding of the absolute code. The novel image sensor, in which row-wise and column-wise operations and readout are made in parallel, is a concept which allows fast-enough image readout and processing for high-speed multidimensional encoders. The inventive positioning code is quasi-periodic, and enables to read the absolute code information, and at the same time to enhance resolution by enabling the precise measurement of the position of the pattern with respect to the pixel arrangement of the detector device.

The 2D position (or phase, in case of a periodic pattern) of the code pattern can be measured based on the sum (or mean) of the column-wise pixel intensities and on the sum (or mean) of the row-wise pixel intensities. Absolute positioning code information can be obtained by decoding the code, which is encoded either in the shape parameters of the markings (e.g. horizontal, vertical or diagonal marking orientations, marking widths, marking heights, or any other detectable parameters) and/or in the sizes of the spacings between the markings. Preferred embodiments enable to generate the row-sum and the column-sum in one step, locating the rows and columns of the markings in the pattern at the same time, and to read the markings in a quick way in the located rows and columns.

An example of the absolute position is given in the following. A 2D code according to e.g. FIG. 12, 16 or 17 can be provided for covering the surface of the Earth with 1 mm period markings. A 9×9 period window (9 mm×9 mm) of such code contains always a unique binary pattern anywhere on the surface of the Earth. By reading this 9×9 bit code the absolute position on Earth can be determined with a 1 mm resolution. Measuring the precise pattern position within the window sub-micrometer resolution can be achieved for the absolute position measurement.

BRIEF DESCRIPTION OF DRAWINGS

In the following, preferred embodiments of the invention will be discussed in detail with reference to the drawings, in which.

MODES FOR CARRYING OUT THE INVENTION

The inventive detector device aims at maximum speed combined with maximum flexibility for reading a quasi-periodic absolute code pattern. Quasi-periodic means that the center of gravity of the markings of the pattern are positioned on a grid, wherein the spacings between the lines defined by the centers of gravity are not necessarily equal.

In the context of the present application, the terms rows and columns describe two orthogonal directions of an arrangement. It is conceivable that the row and column denominations can be exchanged with each other depending on the actual point of view, so those are non-limiting expressions merely denominating the two orthogonal directions of the arrangement.

Figure 1:
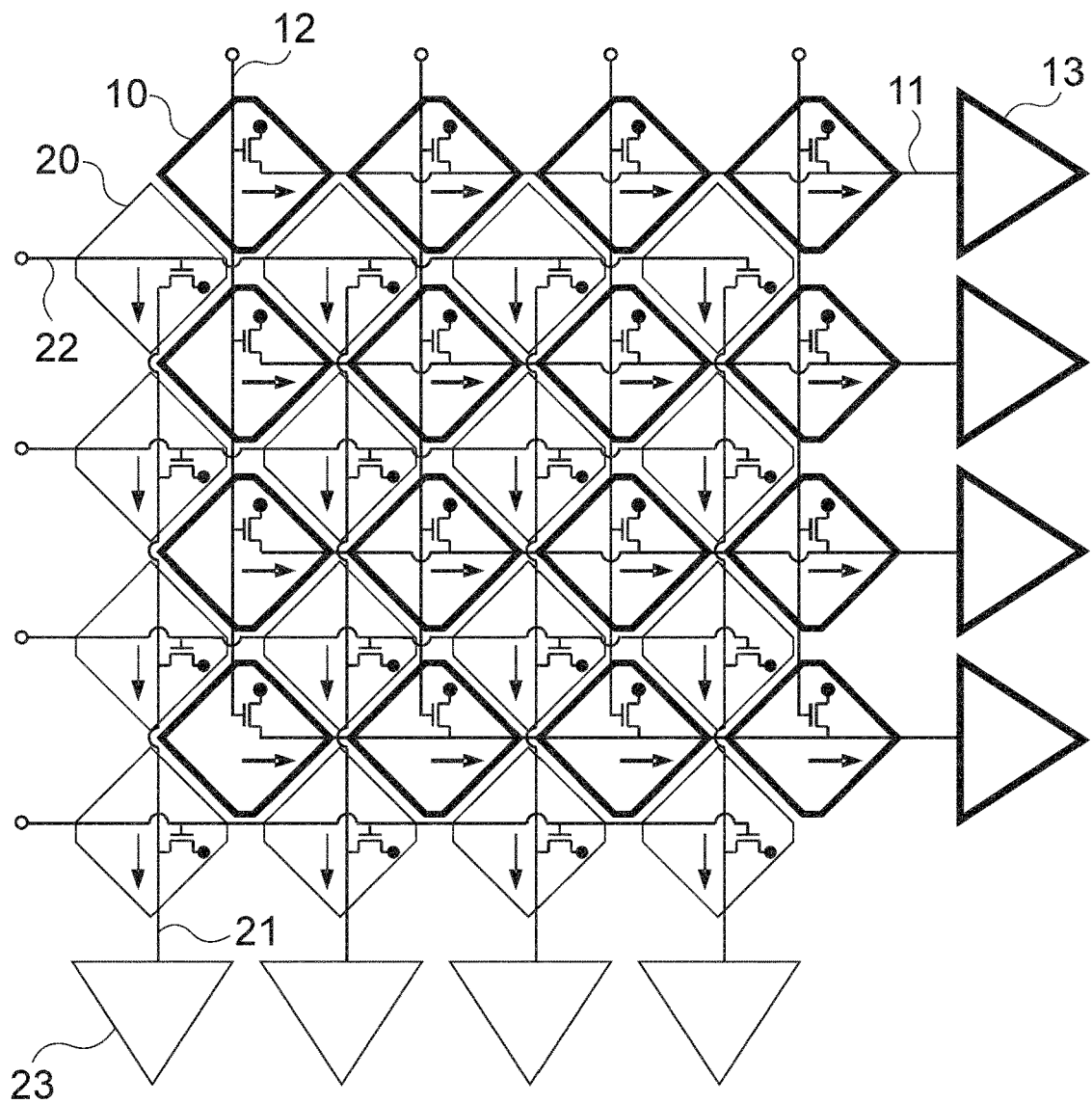
FIG. 1 is a schematic structure diagram of a detector device according to the invention.
Figure 2:
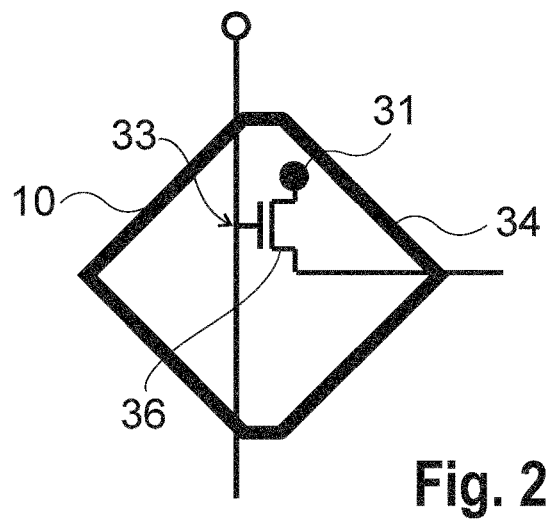
FIG. 2 is a schematic structure diagram of a pixel of the detector device in FIG. 1.

A general schematic structure of an inventive detector device is shown in FIG. 1. The detector device has photo-sensitive or other type of pixels 10, 20 in a two-dimensional arrangement, the arrangement having a row direction and a column direction along which the pixels 10, 20 are aligned in rows and columns. As depicted schematically in FIG. 2 and in more details in FIGS. 3 to 5, each of the pixels 10, 20 comprises a sensor element 30 and an output 31 for outputting an electric signal corresponding to an intensity of radiation incident on the sensor element 30. The radiation can be e.g. light. The electric signal can be e.g. current, or the pixels may output asynchronous pulses rather than currents. In the latter case pulses outputted by the pixels 10, 20 are summed up and transmitted for processing. Furthermore, each of the pixels 10, 20 comprises a readout selection input 33 by which the pixel 10, 20 can be selected for outputting.

To achieve the inventive objects, the detector device comprises row pixels 10, a row readout wiring 11 for each row of said row pixels 10 and a column select wiring 12 for each column of said row pixels 10, wherein in each row of said row pixels 10, the output 31 of each row pixel 10 is selectably connectable to the row readout wiring 11 using the readout selection input 33 of the row pixel 10, the row readout wiring 11 transmitting the sum of electric currents or the sum of other electric signals outputted from the row pixels 10 actually connected to the row readout wiring 11, and wherein in each column of said row pixels 10 the column select wiring 12 is connected to the readout selection inputs 33 of the row pixels 10 of the column, and column pixels 20, a column readout wiring 21 for each column of said column pixels 20 and a row select wiring 22 for each row of said column pixels 20, wherein in each column of said column pixels 20, the output 31 of each column pixel 20 is selectably connectable to the column readout wiring 21 using the readout selection input 33 of the column pixel 20, the column readout wiring 21 transmitting the sum of electric currents or the sum of other electric signals outputted from the column pixels 20 actually connected to the column readout wiring 21, and wherein in each row of said column pixels 20 the row select wiring 22 is connected to the readout selection inputs 33 of the column pixels 20 of the row, analog-to-digital converters 13 adapted for row-parallel operation, each being connected to a respective one of the row readout wirings 11, analog-to-digital converters 23 adapted for column-parallel operation, each being connected to a respective one of the column readout wirings 21, and a column and row selecting device connected to the column select wirings 12 and to the row select wirings 22, and being adapted for selecting simultaneously one or more columns of row pixels 10 for row parallel readout and one or more rows of column pixels 20 for column parallel readout.

The analog-to-digital converters 13, 23 serve for providing a digital signal for further processing. The input of these elements are the electric signals on the row readout wirings 11 and column readout wirings 21. The electric signals can be preferably currents, but voltages, pulses or any combination of these are also conceivable. In case of pulses, the analog-to-digital converters 13, 23 can have a form of counters providing the digital sum of the arriving pulses.

Advantages of the inventive detector device are that maximum readout speed can be combined with maximum flexibility. By enabling to select any set of rows/columns within the range of 1 and all rows/columns, simultaneous row- and column-parallel readout of any pixel up to all pixels is possible, so pattern position/absolute code can be read at a high-speed with the same detector device.

Column and row pixels can be grouped from 1 to all. In case of selecting a group of 1 row or 1 column: all individual pixels are read out in N steps in a 2×N×N pixel array. Column-parallel read-out and row-parallel read-out are carried out simultaneously. In case of selecting a group of ~T/2, where T is the pattern period in pixels, an ideal high-speed, n-step read-out of $N^2$ bit absolute code is possible. In case of selecting a group of N/2, the sum of half columns and sum of half rows can be read out in two steps, which is ideal to measure image rotation in addition to the 2D position, as detailed later. In case of selecting a group of N, i.e. all rows and columns, ideal highest-speed, one-step readout of column-sums and row-sums for 2D position is enabled.

The inventive pixel layout allows to interlace the row pixels 10 and the column pixels 20 in a single array allowing simultaneous row-wise and column-wise operations in parallel. An m×n pixel array, i.e. n pixel columns are connected to the n column-parallel analog-to-digital converters (ADCs) 23 (thin lines). In an interlaced manner, another m×n pixel array, i.e. m pixel rows are connected to the m row-parallel ADCs 13 (thick lines).

According to an aspect depicted in FIG. 1, the two-dimensional arrangement of the pixels has two diagonal directions, intersecting the row direction, the column direction and each other, along which the pixels are diagonally aligned, and along which the row pixels 10 and column pixels 20 are alternatingly arranged.

Preferably, the pixels have a rhomboid-like shape, the 34 sides of which are in parallel with the diagonal directions, wherein the pixels are arranged with a spacing smaller than the length of the side 34 of the rhomboid-like shape. In this way a large effective surface can be ensured for the detector device, together with an interlaced "view" of the same area by the row and column pixels 10, 20.

Figure 3:
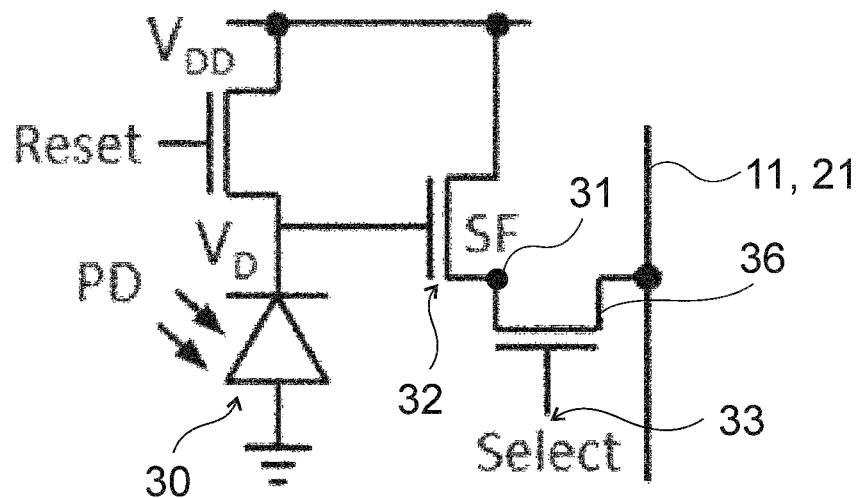
FIG. 3 is an exemplary circuit diagram of a pixel of the detector device in FIG. 1.
Figure 4A:
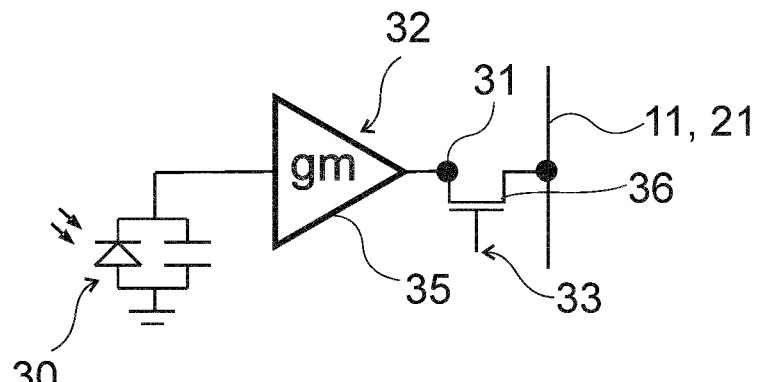
FIG. 4A is a schematic diagram of a part of a pixel having a transconductance unit.
Figure 4B:
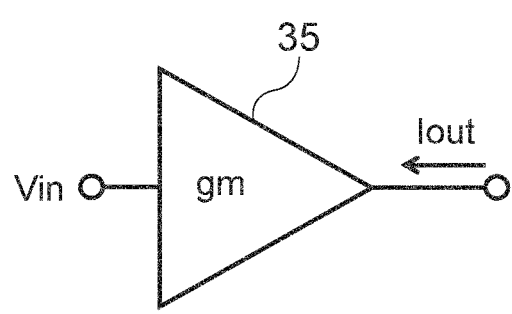
FIG. 4B is the symbolic representation of the transconductance unit.
Figure 4C:
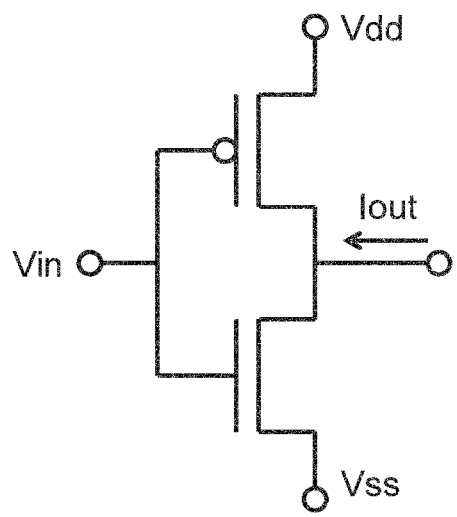
FIG. 4C is an example of a 2 CMOS transistor transconductance unit.
Figure 5:
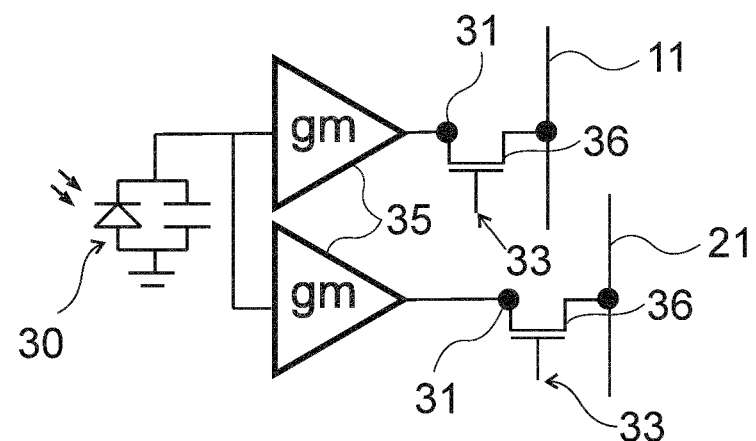
FIG. 5 is a schematic diagram of a part of a pixel having two outputs (row and column) and two transconductance units, FIG. 6. is a schematic diagram of a detector device controlled by a programmable address generator and sequencer unit.

In some applications, pixels are to be read more than one time. As detailed later, the 2D position of the pattern can be measured by reading in one step all rows and columns, and subsequently the absolute code can be read by targeted binning of pixel-groups. For such applications it is important that pixels keep their values after the first read, i.e. that they enable a non-destructive readout. So, as depicted in FIGS. 3 to 5, according to a second aspect, the pixels further comprise a non-destructive readout circuit 32 between the sensor element 30 and the output 31. The non-destructive readout circuit 32 preferably comprises a transconductance unit 35.

The readout selection input 33 is preferably a gate terminal of a MOSFET 36 constituting a select switch, wherein the output 31 of the pixel is connected to the source of the MOSFET and the drain of the MOSFET is connected to the respective row readout wiring 11 or column readout wiring 21. FIG. 4A depicts the inherent capacitance of the sensor element 30, being typically a photodiode, and the general transconductance unit 35. FIG. 4B is the symbolic representation of the transconductance unit 35, while FIG. 4C is an example of a two-CMOS transistor transconductance unit.

Alternatively to the pixel array of FIG. 1, as depicted in FIG. 5, each pixel may be a row pixel 10 and a column pixel 20 at the same time, e.g. like a conventional pixel matrix, in which case each pixel comprise two readout selection inputs 33 and two outputs 31 for enabling both row-wise and column-wise readout.

Figure 6:
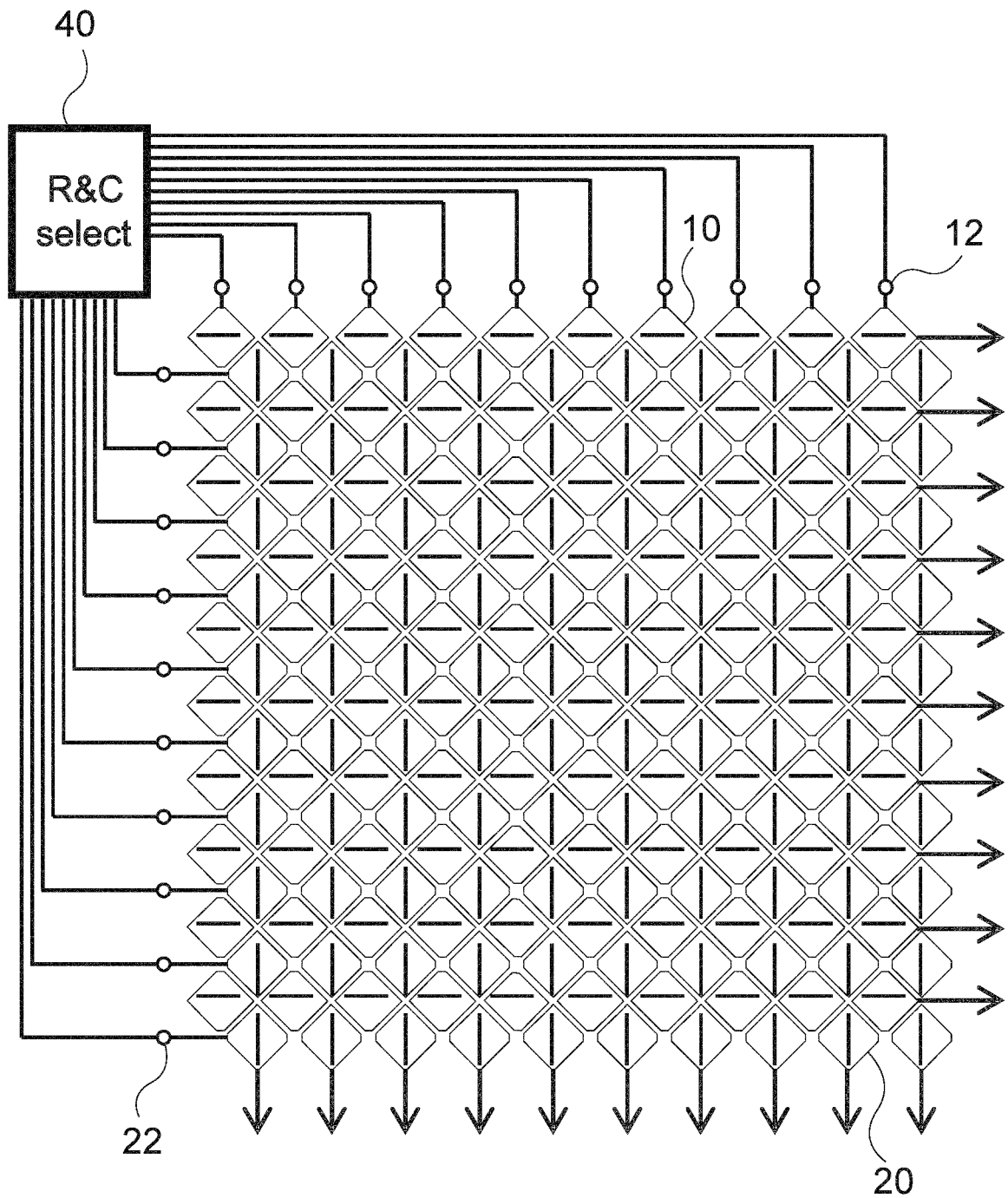

As shown in FIG. 6, the column and row selecting device can be a programmable address generator and sequencer unit 40, which is connected to the column select wirings 12 and to the row select wirings 22, and can be programmed to activate the wirings according to the desired readout. Assuming an n×n (n times n) pixel arrangement, all possible row select, column select configurations can be performed in each clock cycle using n bit row address and n bit column address. As detailed later, columns and rows of code-markings may be located in a first position determining step, and even a rotation-measurement can be carried out, the outcomes of which may influence the subsequent addressing of the column select wirings 12 and to the row select wirings 22. Therefore, the address generator and sequencer unit 40 may receive feedback information from the readout-results, and the addressing may at least partly be based on the feedback information. For the sake of simplicity, the DA converters are not depicted in this FIG.

Figure 7:
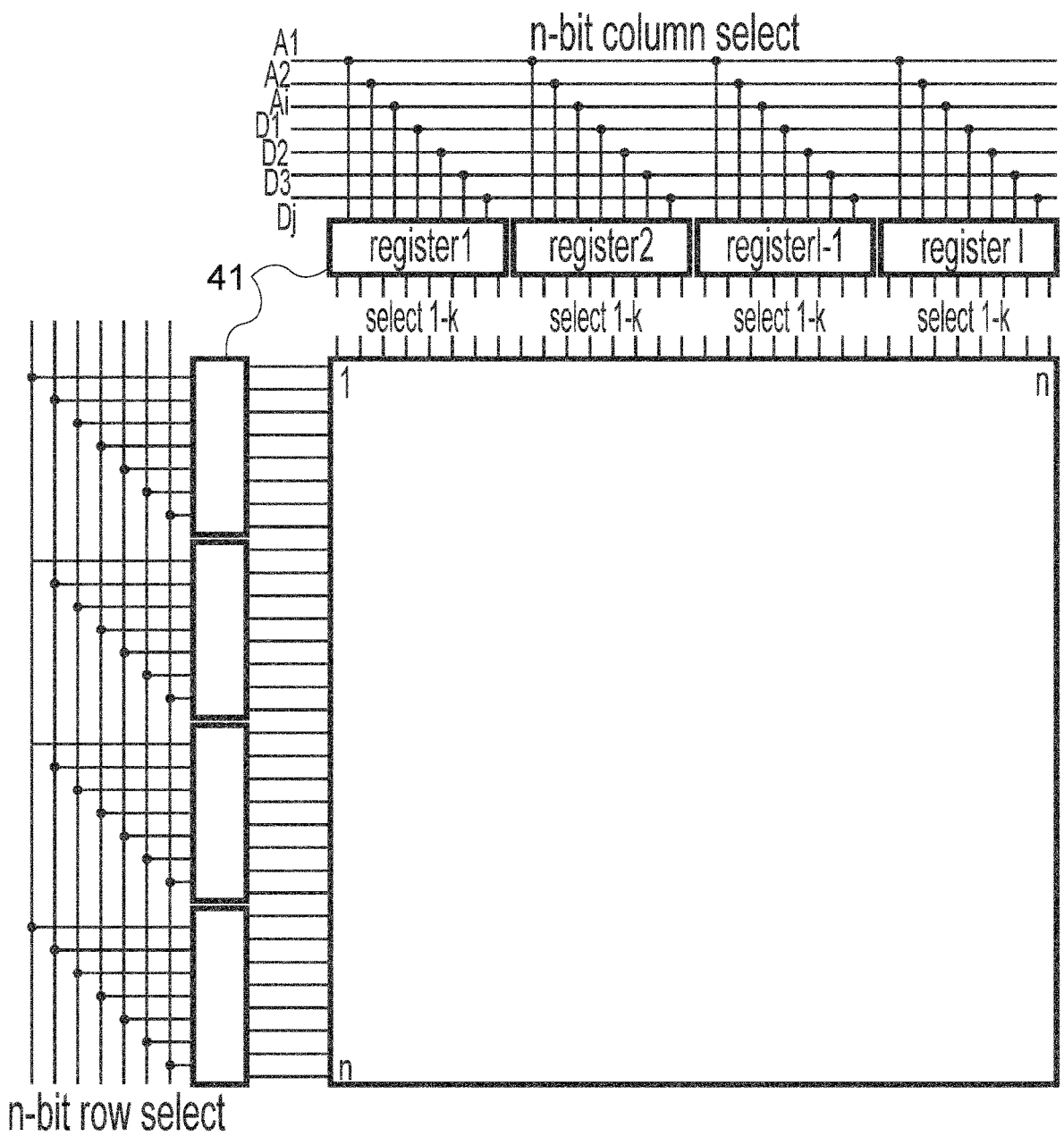
FIG. 7 is a schematic diagram of a detector device controlled by writable registers.

A more compact implementation is depicted in FIG. 7, which uses writeable registers 41 for selecting rows and columns in an arbitrary manner. In one clock cycle only one register 41 is written, so l clock cycles are needed to write l registers. i=ceil($\log_2$(l)) address bits are needed to address all registers 41. One register 41 can select k rows or columns. The data bits written to the register 41 determine the selected rows or columns by that register. k rows or columns can be addressed in an arbitrary manner by j=ceil ($\log_2$(k)) data bits. In a typical example three address bits can address eight 4-bit registers, each register 41 can address 16 rows or columns. The eight registers 41 can be programmed in eight clock cycles. An ADC conversion takes typically 8-12 clock cycles. During the conversion of one group of rows or columns the new row/column select vectors can be written to the registers 41. Again, the programing of the registers 41 may at least partly be based on a feedback information from the readout-results.

Figure 8:
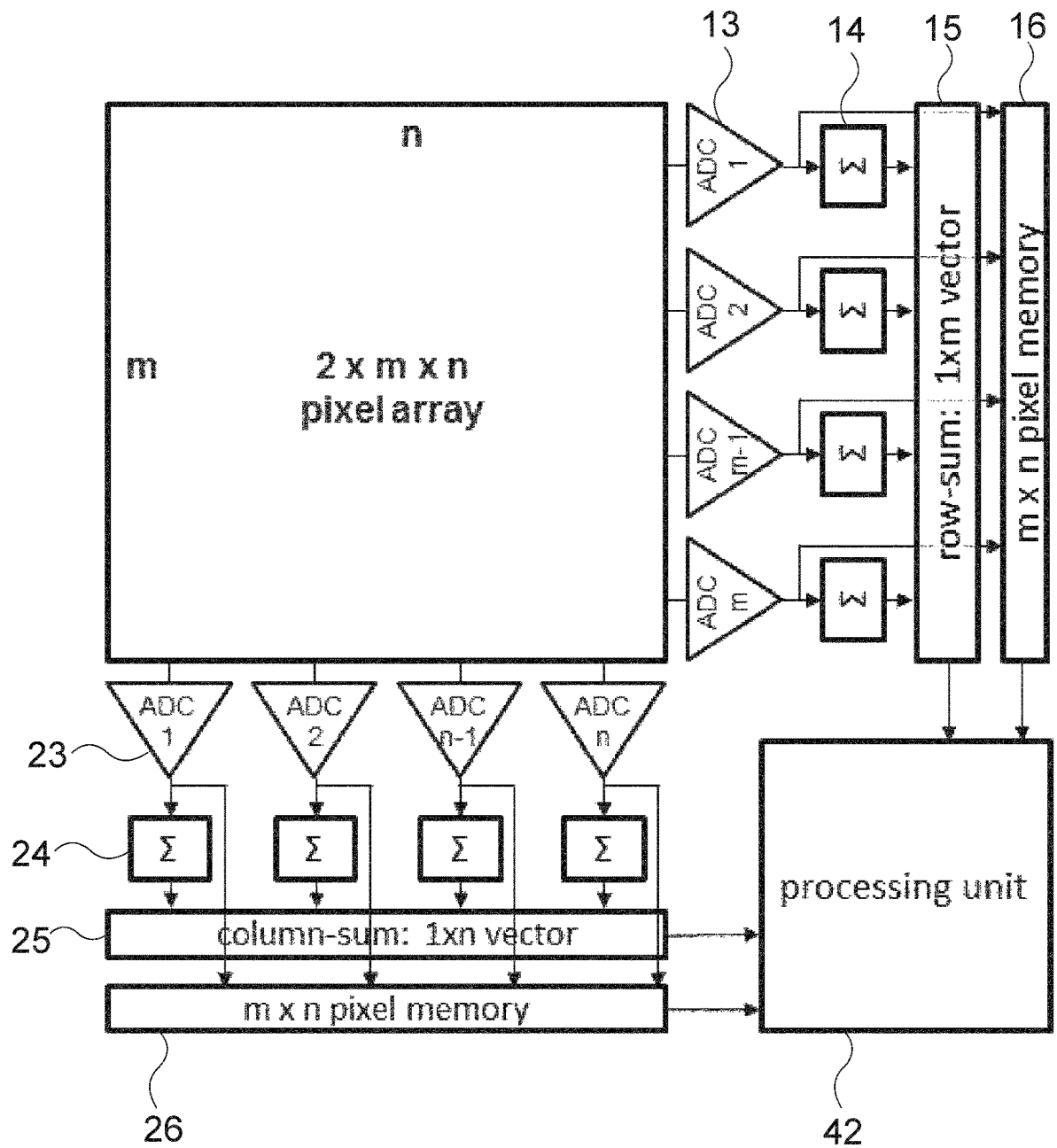
FIG. 8 is a schematic diagram of a detector device with subsequent processing elements.

FIG. 8 depicts some subsequent processing elements and possibilities, mainly for the case if no non-destructive readout is possible. As already described, the row-sum—being a row-sum vector 15—are preferably generated in a single step, together with the column-sum—being a column-sum vector 25. These vectors can be used for measuring the position of the pattern with respect to the pixel arrangement (or in other words with respect to the corresponding detector device), and also for locating rows and columns of markings for targeted and high-speed readout of the absolute code. The summing circuits 14 and 24 depict the summing functionality in case all pixels can be read only once. At the same time of summing, m×n pixel memories 16, 26 can be filled in n (n>m) steps, which can be used to detect absolute code or other information. The pixel memories 16, 26 contain redundant information, so their content can be used to verification purposes as well by a processing unit 42.

Figure 9:
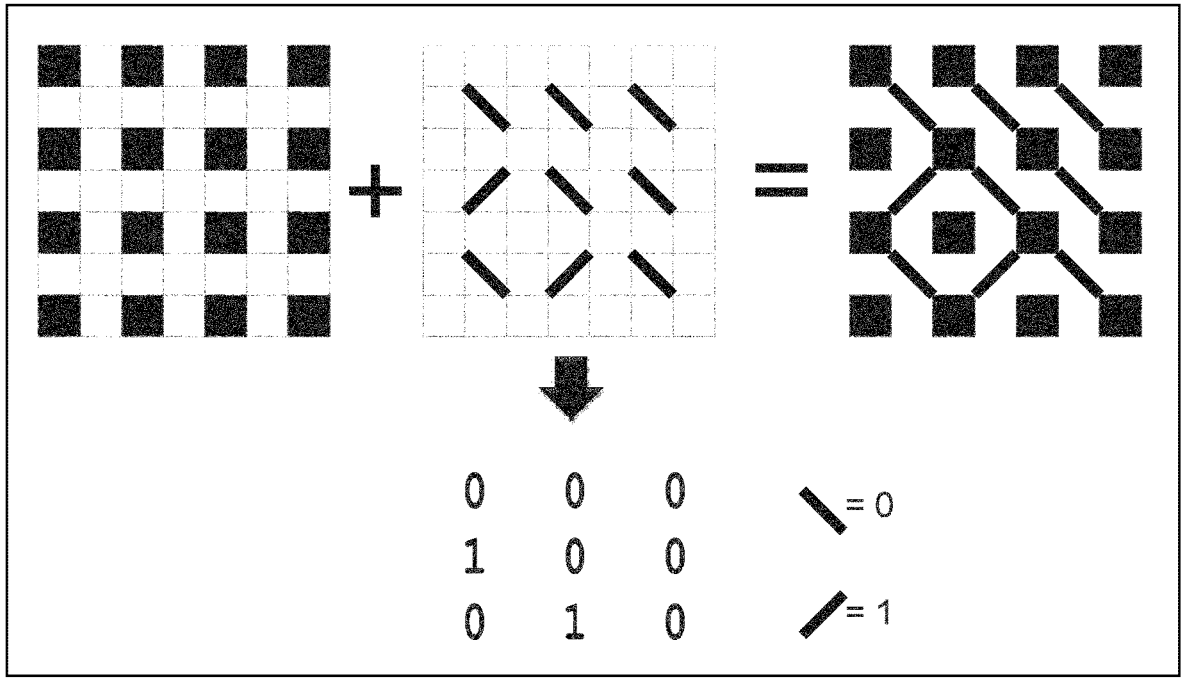
FIG. 9 shows a prior art code pattern.

FIG. 9 depicts the general positioning code structure of prior art solutions. According to the known techniques, pixel-based encoders are used with a two-dimensional positioning code consisting of a two-dimensional regular (repetitive) pattern, being a periodic set of squares in the depicted example, and an absolute code, being a set of diagonal sections in the example, which is interlaced with two-dimensional regular pattern. The absolute code is coded by the diagonal orientations of the sections, and can be read for establishing the absolute code, while the two-dimensional regular pattern serves for enhancing resolution. The position of the two-dimensional regular pattern with respect to the pixel-arrangement of the encoder can be determined and thus the resolution highly enhanced. The prior art positioning code thus enables both high-spatial-resolution, and absolute measurement.

An idea of the invention is to eliminate the two-dimensional regular pattern, and to use the absolute code pattern also for determining the position of the two-dimensional regular pattern with respect to the pixel-arrangement of the encoder.

In the context of the present application, the term 'positioning code' and 'markings' are used in the sense that those are the code and its markings imaged onto the surface of the pixel arrangement of a detector device. The code can be fixed to a suitable element of the position determining application, and the imaging can be effected by any suitable means. Markings have a different optical and/or physical property than their background.

Figure 10:
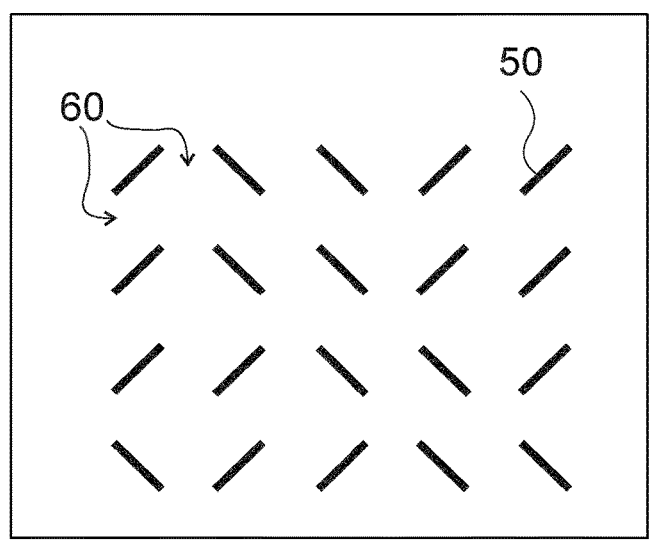
FIG. 10 shows an inventive code pattern.

Thus, FIG. 10 depicts an example of an inventive positioning code for use with a detector device having pixels 10, 20 in a two-dimensional arrangement, the pixel arrangement having a row direction and a column direction along which the pixels 10, 20 are aligned in rows and columns. The code consists of markings 50 in an arrangement having a row direction and a column direction along which the markings 50 are arranged in spaced rows and/or spaced columns. In the context of the present application, markings aligned along two orthogonal logarithmic spirals or other orthogonal curves are also considered to be arranged along a row direction and a column direction; these embodiments are especially advantageous if the code area has a large radial extent. The spacings 60 are marking-free, and the absolute positioning code is coded by the shape parameters of the markings 50 and/or by the distances determined by the spacings 60. In this context, the term 'shape parameters of the markings' covers any visual feature of the markings that can be used for the coding purpose, e.g. different dimensional parameters, orientations, geometry, shape-features or shapes can be used for coding.

Figure 11:
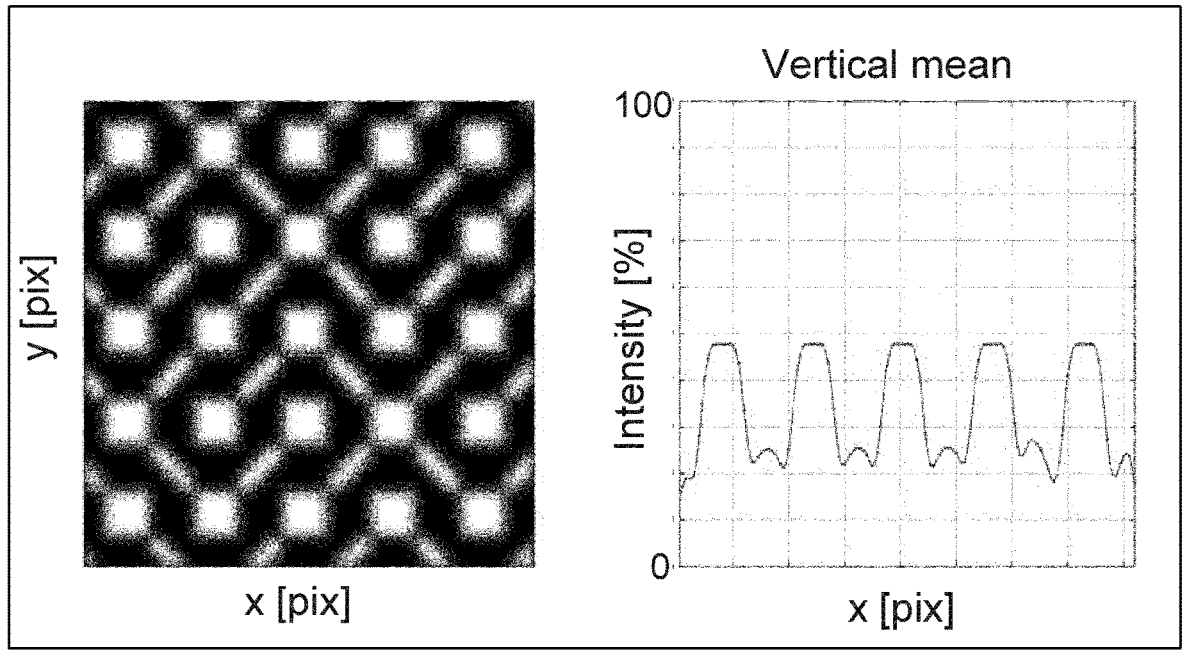
FIG. 11 shows an image of a prior art code pattern with a vertical mean diagram of the pixel values.
Figure 12:
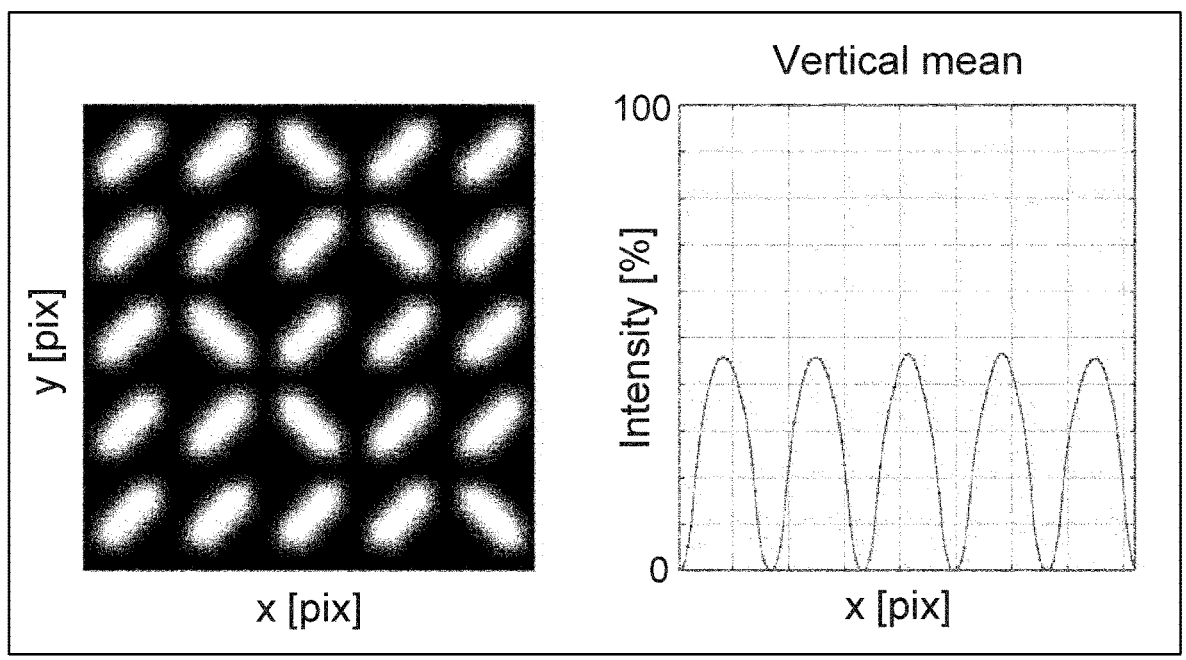
FIG. 12 shows an image of an inventive code pattern with a vertical mean diagram of the pixel values.

FIGS. 11 and 12 show the advantages of the inventive positioning code with respect to the prior art code. It is conceivable from the diagrams of the vertical mean values of the pixels that 2× better S/N (signal-to-noise) ratio can be achieved by the inventive code pattern, as the 'contrast' is higher by eliminating the periodic pattern. The quality of the summing (averaging) is better for the inventive pattern, because
 the signal-to-noise ratio is higher, and
 there is no $2^{nd}$ harmonic in the signal, more power remains in the main harmonic where the measurement takes place.

The advantages of the inventive code pattern are the following:
 2× better precision and resolution can be achieved,
 more robustness with respect to noise,
 2× higher speeds can be achieved (speed of motion of pattern on the sensor),
 layout is compatible with high resolution metal and other mask technologies, as the holes are separated with continuous sections, thereby avoiding falling apart. The minimum dimensions of separations between holes impose lower limitations on the pattern.

FIGS. 13 to 17 depict preferred, non-limiting examples of markings that can be used in the inventive positioning code. Of course, other suitable marking can also be applied.

Figure 13:
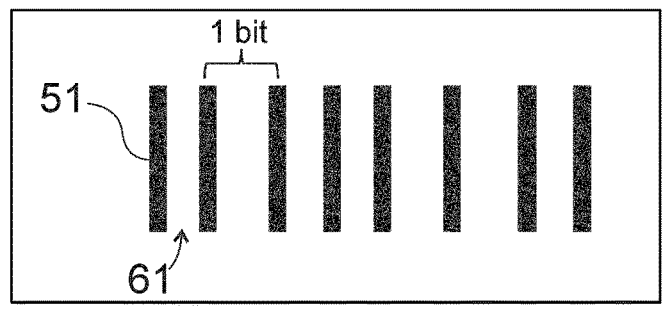
FIG. 13 shows a one-dimensional PPM positioning code according to the invention.

FIG. 13 shows a one-dimensional PPM (pulse position modulation) code, wherein the shapes of the markings 51 are identical and the absolute positioning code is coded by the distances determined by the spacings 61.

Figure 14:
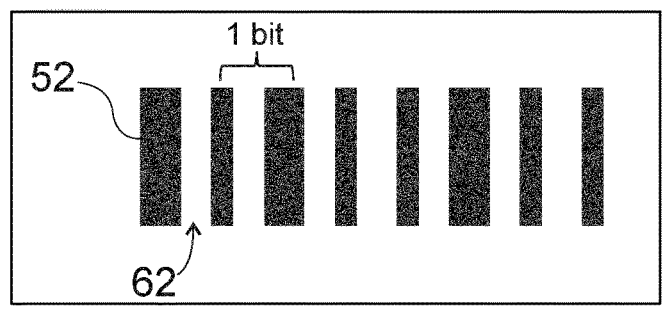
FIG. 14 shows a one-dimensional PWM positioning code according to the invention.

FIG. 14 shows a one-dimensional PWM (pulse width modulation) code, wherein the spacings 62 determine identical distances and the absolute positioning code is coded by the widths of the markings 52. In this case the absolute positioning code is coded by the shape parameters of the markings 52, namely by their widths.

In the positioning codes in FIGS. 13 and 14, one period encodes one bit, so N periods encode N bits in the array, enabling the encoding of $2^N$ absolute positions.

Figure 15:
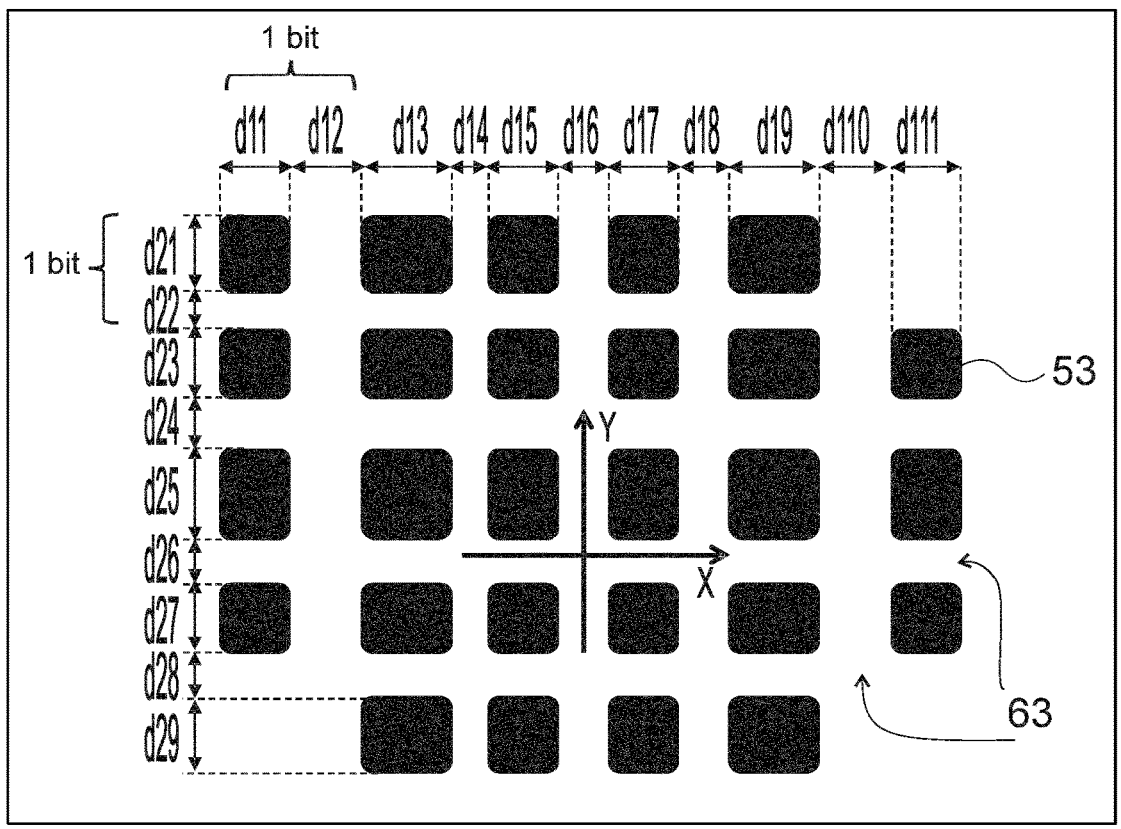
FIG. 15 shows a two-dimensional positioning code comprising markings positioned along two orthogonal X and Y dimensions.

FIG. 15 shows a two-dimensional code comprising markings 53 positioned along two orthogonal X and Y dimensions of a code coordinate system. The X extensions and the X positions of all markings 53 in a column are equal, and the Y extensions and the Y positions of all markings 53 in a row are equal. Absolute position information is coded by $d_{ij}$ distances in the two orthogonal X and Y dimensions determined by the extensions of the markings 53 and by the spacings 63 between the markings 53. In this code pattern, being a two-dimensional PPWM (pulse position and width modulation) code one column-period encodes one bit and one row-period encodes one bit. 2N periods encode 2N bits in the array, enabling the encoding of $2^{2N}$ absolute positions. The markings 53 can have any suitable geometry (e.g. rectangle, triangle, pentagon, hexagon, octagon, etc., circle, ellipse, star, random shape, etc.).

The code patterns of FIGS. 13 to 15 have the advantage that the readout of the absolute code and that of the position of the pattern with respect to the pixel arrangement—by reading e.g. with a detector device discussed above—can be carried out in a single step, so no multiple readout of pixels is necessary and the non-destructive circuits are not necessary in the pixels.

Figure 16:
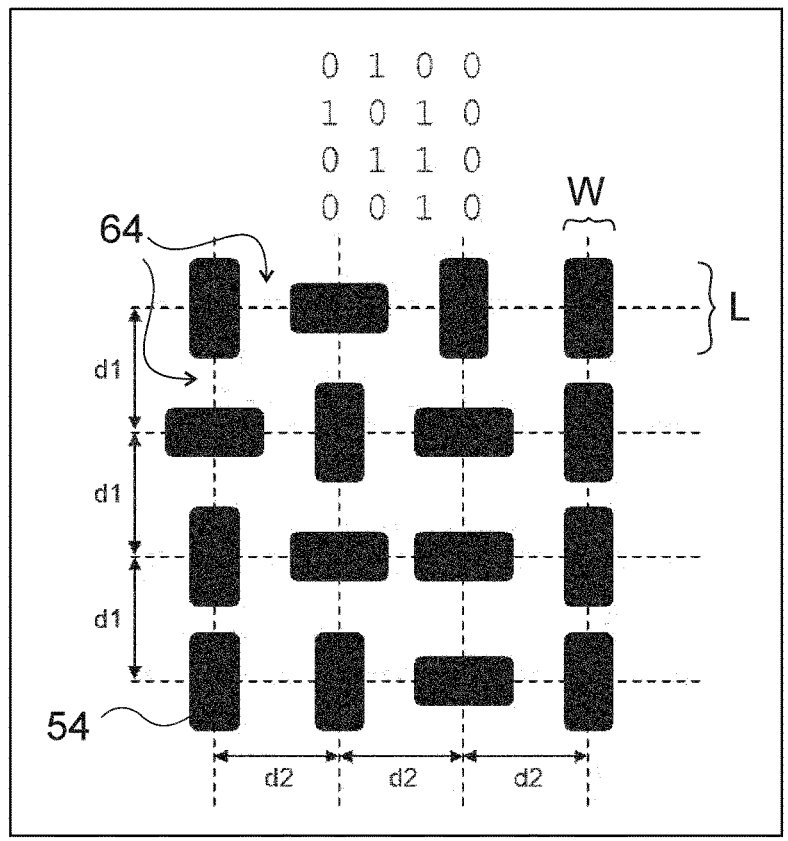
FIG. 16 shows a two-dimensional positioning code comprising elongated markings and having a row-parallel (or horizontal) orientation or a column-parallel (or vertical) orientation.

FIG. 16 shows a two-dimensional code comprising markings 54 having the same shape and having spacings 64 therebetween, the markings are elongated and have a larger longitudinal size L than their crosswise size W, their crosswise size W is larger than the row-parallel and column-parallel dimensions of a pixel 10, 20. Absolute code is coded by the row-parallel or column-parallel orientations of the markings 54, the orientation is thus the shape parameter used for coding purposes. In this positioning code, one marking 54 in a row-period encodes one bit, one marking 54 in a column-period encodes one bit, so $N^2$ periods encode $N^2$ bits in the array, enabling the encoding of $2^{N \cdot N}$ absolute positions. FIG. 16 also shows the coded bit values of the exemplary code pattern.

Figure 17:
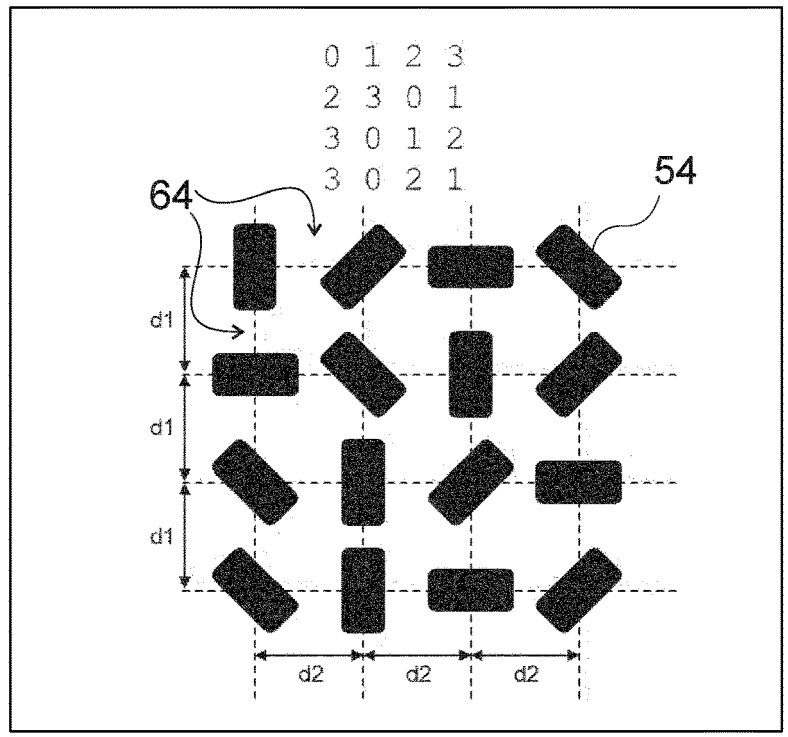
FIG. 17 shows a two-dimensional positioning code as in FIG. 16, the markings additionally having any of the two diagonal orientations.

FIG. 17 shows a code pattern similar to that of FIG. 16, comprising markings 54 that may have two additional orientations, namely any of the two diagonal orientations. One marking 54 has four states and encode $\log_2(4)=2$ bits. So, one marking 54 in a row-period encodes 2 bits, one marking 54 in a column-period encodes 2 bits, thus $N^2$ periods encode $2 \cdot N^2$ bits in the array, enabling the encoding of $2^{2 \cdot N \cdot N}$ absolute positions.

In FIGS. 16 and 17 the distances of the centers of the markings are d1 and d2 in the column and row directions. In a preferred embodiment d1=d2.

Figure 18:
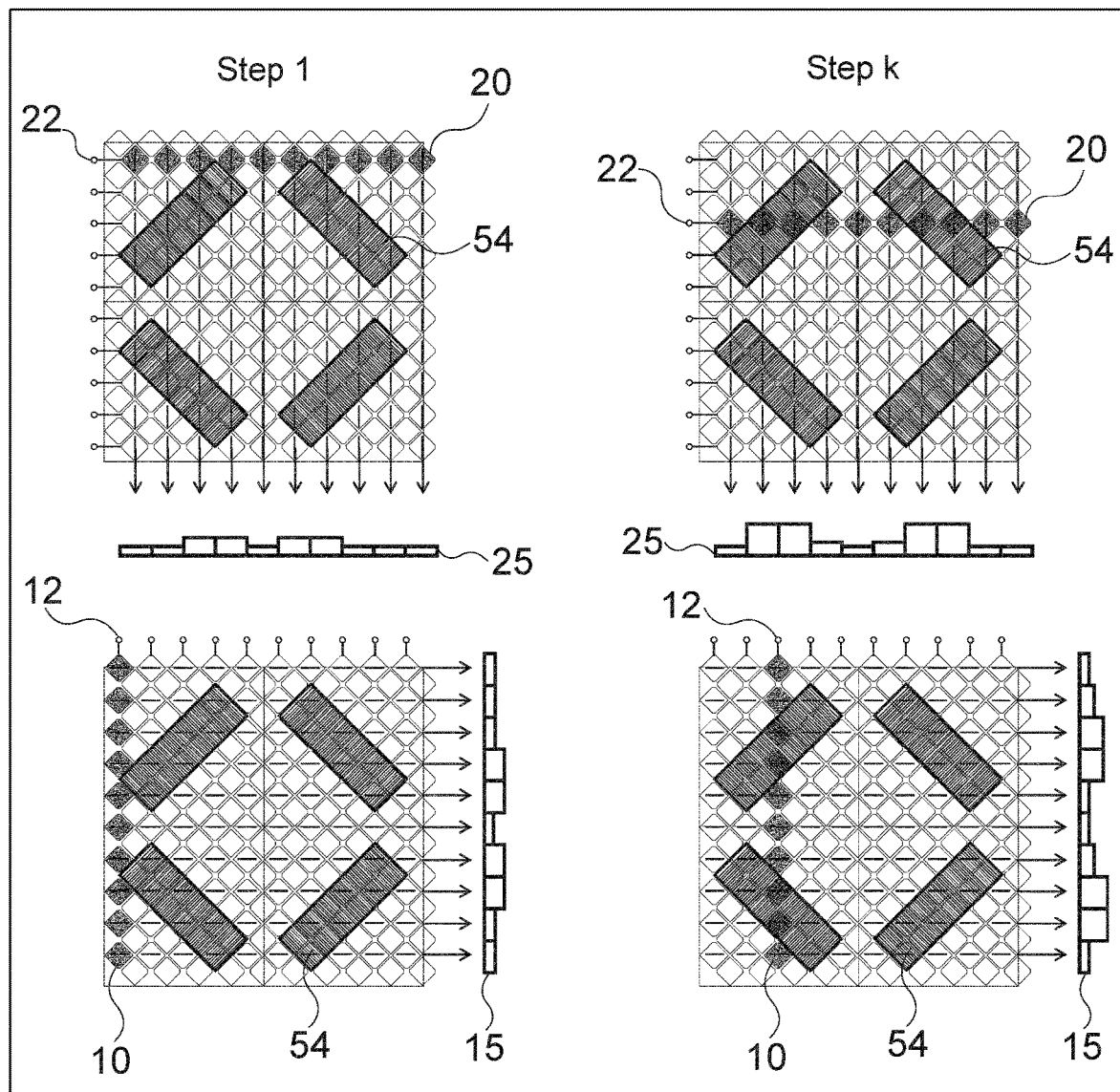
FIG. 18 shows two steps of a sequential reading of all pixels of the detector element.

FIG. 18 shows the first and the $k^{th}$ steps of reading out all pixels of a pixel arrangement of a detector device. The detector device has pixels 10, 20 in a two-dimensional arrangement, the arrangement having a row direction and a column direction along which the pixels 10, 20 are aligned in rows and columns. The detector device can be that according to the invention discussed above, but also conventional detector devices having a suitable pixel-arrangement can be used. In the latter case, the row- and column-parallel readout is not hardware-supported, but can be carried out by a computer program on a pixel memory in which all pixel values are read in a conventional way. Accordingly, the inventive method is suitable for conventional detector devices as well.

A code pattern consisting of markings 54 is used, the markings 54 being in an arrangement having a row direction and a column direction along which the markings 54 are arranged in marking rows and/or marking columns, wherein the row and column directions of the marking arrangement are aligned with the row and column directions of the pixel arrangement. The term 'aligned' in this context means that the row and column directions of the marking arrangement coincide with the row and column directions of the pixel arrangement or are slightly rotated with respect to each other to an extent still enabling the detection functionalities. It has been found that both position detection functionalities (pattern position and absolute code) can be carried out—in the given case with the help of rotation-measurement and compensation described later—if the rotation angle $\alpha < \arctan(d/(N*d)) = \arctan(1/N)$; where d is the spacing between pattern rows/columns and N is the number of pattern periods in the measured region (the region where row/column sums are calculated). It is noted that this is also an advantage with respect to prior art solutions, that larger rotation can be handled.

The inventive method serves both for detecting a code pattern position with respect to the two-dimensional arrangement of the pixels 10, 20, and an absolute code coded by the code pattern. As described above, the markings 54 are arranged in the code pattern in spaced rows and/or spaced columns, wherein the spacings 64 between the rows and/or columns are marking-free, and wherein an absolute positioning code is coded by the shape parameters—in the depicted case the orientations—of the markings 54. As described earlier, absolute positioning code can also be coded additionally or only by the distances determined by the spacings 64.

If necessary, as depicted in FIG. 18, individual pixels can be read by selecting the first row of column pixels 20 and generating the corresponding column-sum vector 25, and by selecting the first column of row pixels 10 and generating the corresponding row-sum vector 15. Values of individual pixels can be found in the vector values. If carried out with an inventive detector device, the two readings in the first column of the FIG. can be carried out simultaneously, in step 1. In step k, the $k^{th}$ row of column pixels and the $k^{th}$ column of row pixels are selected for readout. In n steps n column pixel vectors and n row pixel vectors, altogether 2×n×n pixel matrix values can be obtained.

Figure 19:
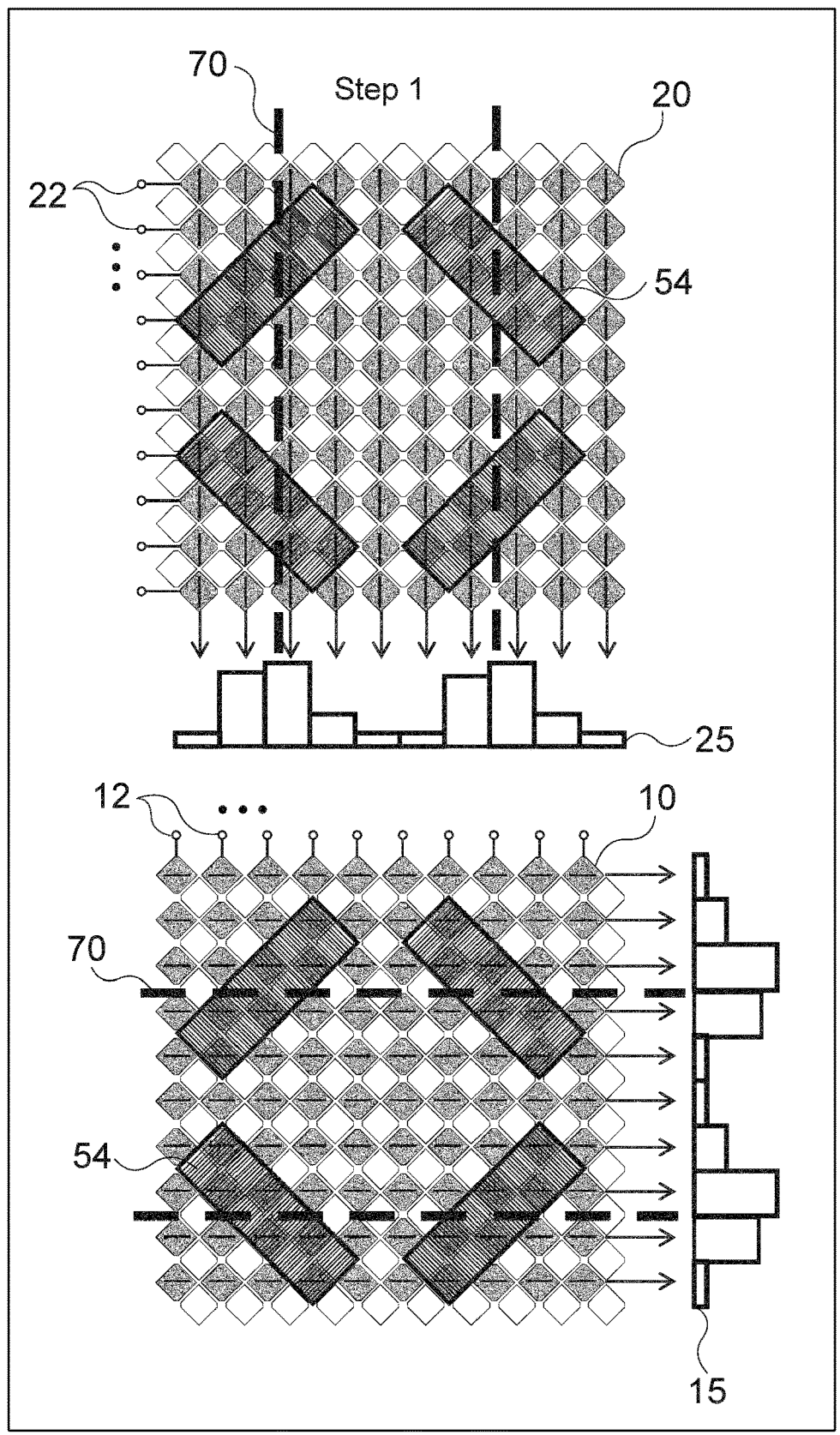
FIG. 19 shows the one-step reading of the position information in the case of longitudinal markings coding by the two diagonal orientations.

As depicted in FIG. 19, the code pattern position is detected by generating a column-sum vector 25 and a row-sum vector 15 of the pixel values, and on the basis of the values of the column-sum vector 25 and the row-sum vector 15, the positions of the marking columns and marking rows with respect to the two-dimensional arrangement of the pixels 10, 20 are detected. These positions may be defined as the positions of the center-lines 70 of the marking columns and marking rows. These positions constitute the code pattern position. In the context of the present application, in case the positions (of the center-lines 70) are periodic, the code pattern position with respect to the two-dimensional arrangement of the pixels can also be characterized with a phase value (calculated with respect to the pixel arrangement), being in one-to-one relationship with the marking row and column (or their center-lines 70) positions. Accordingly, the term 'positions of marking rows and columns' is considered in this context to be equivalent with the corresponding phase value.

The positions of the of marking rows and columns, preferably those of their center-lines 70, can be calculated using any known techniques from the values of the vectors.

In case of using an inventive detector device, for detecting the code pattern position, the row-sum vector 15 is generated by selecting all columns of the row pixels 10 for row-parallel readout, and the column-sum vector 25 is generated by selecting all rows of column pixels 20 for column-parallel readout.

Next, the absolute code is decoded by reading the code pattern. In case of positioning codes according to FIGS. 13 to 15, the row-sum vector 15 and the column-sum vector 25 generated by selecting all rows/columns is suitable for reading, decoding the absolute code.

In case of markings as in FIGS. 16 and 17, separate reading steps are necessary for the absolute code. To this end, before the decoding step, the rows of markings 54 and the columns of markings 54 are located on the basis of the values of the row-sum vector 15 and the column-sum vector 25 generated. The term 'locating' means that information is available in the vectors relating to the positions and dimensions of the marking rows and columns, which can be effectively used to maximum speed, targeted reading of the individual markings. This location information, combined with a priori knowledge of the positioning code pattern markings, can be used for reading the absolute code.

Preferably, absolute code decoding is carried out by
  reading the rows of markings 54 one by one, wherein for each located row of markings 54, selecting for readout one or more column pixel 20 rows intersecting the markings 54 and being suitable for detecting information carried by each of the markings 54 on the basis of the column-sums of the selected column pixel 20 rows, and
  reading the columns of markings 54 one by one, wherein for each located column of markings 54, selecting for readout one or more row pixel 10 columns intersecting the markings 54 and being suitable for detecting information carried by each of the markings 54 on the basis of the row-sums of the selected row pixel 10 columns.

Figure 20:
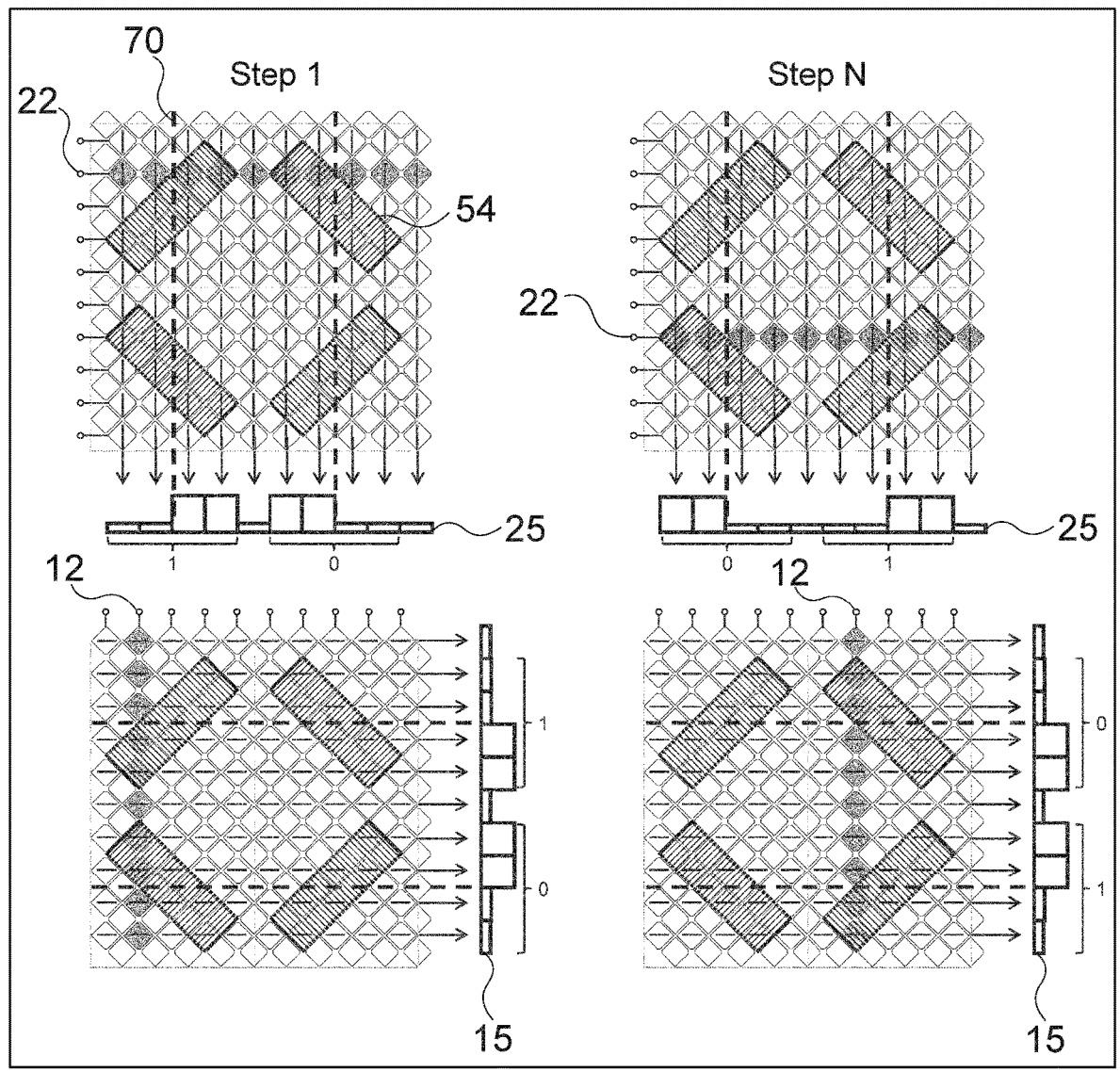
FIG. 20 shows the row- and column-wise one-step readings of the absolute code subsequent to the step in FIG. 19.

The inventive detector device enables that at least one row of markings 54 and one column of markings 54 are read simultaneously, as depicted in FIG. 20. Preferably, the columns/rows are read in pairs, resulting in a considerable speedup of detecting.

In case if diagonal markings 54 are used, in the reading steps of each of the rows and columns of the markings 54, a column pixel 20 row being spaced from the center line 70 of the respective row of markings 54 and a row pixel 10 column being spaced from the center line 70 of the respective column of markings 54 are selected for reading. The $N^2$ bits of absolute code is read out in N steps. N is the number of marking rows and columns. In this example each marking 54 encodes one bit.

Accordingly, the initial 2D position measurement yields the position and location of marking columns and marking rows. A row of column pixels 20 and a column of row pixels 10 are selected in such a way that those sample the upper half (or equivalently the lower half) of the marking row and the marking column respectively. This way pixel activity is asymmetric with respect to the center line 70 of the marking rows and the center line 70 of marking columns, respectively.

The images show examples of the code reading. E.g. in the upper left image, the selected row of column pixels 20 results in asymmetric pixel activity, for bit 1,1 (upper left marking 54, logical 1 value) the activity is higher on the right side of the center line 70, while for bit 2,1 (lower left marking 54, logical 0 value) the activity is higher on the left side on the center line 70. It is noted that the parallel read-out column-wise and row-wise is redundant, each bit is read out by two independent readings, allowing consistency check and error detection.

There are various possibilities to increase redundancy and improve consistency check. E.g. one row/column can be sampled in two positions symmetrically with respect to the center lines 70, yielding a more robust differential signal for the bit reading.

Figure 21:
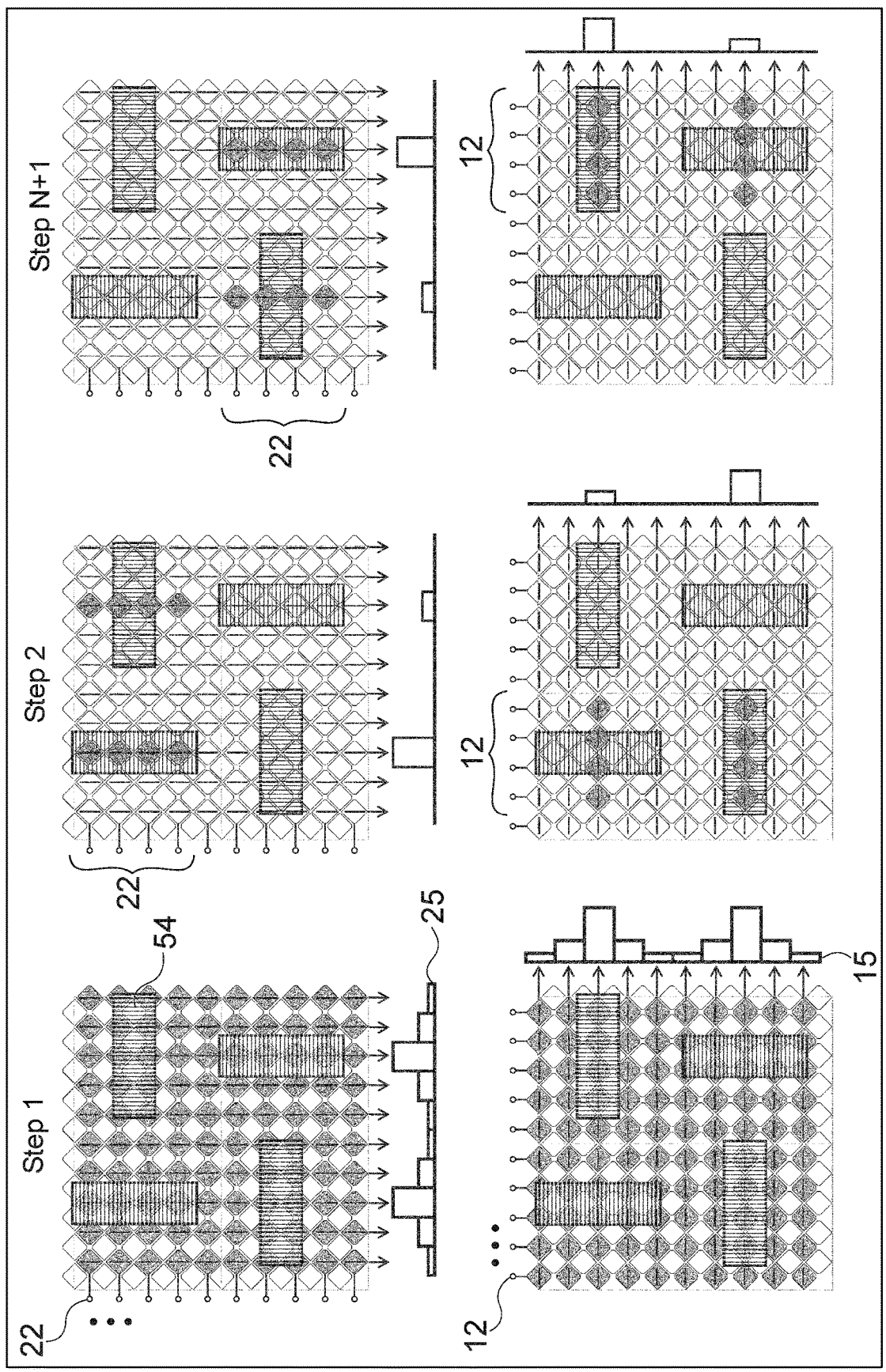
FIG. 21 shows the one-step reading of the position information and the additional N steps of absolute code reading in the case of a longitudinal marking coding by row-parallel and column-parallel orientations.

FIG. 21 shows the one-step readout of the position, and the subsequent N steps of the code-reading in the case of another marking orientations. $N^2$ bits of absolute code is read out in N steps. N is the number of marking rows and columns. In this example each marking encodes one bit. Codes with two bits per marking are also possible, if the additional diagonal orientations are also used.

The first step yields the position/location of marking columns and marking rows. In the image only those pixel columns/rows are shown, which are used to determine marking orientation. Other pixel columns/rows may be selected, but are preferably not taken into account. E.g. those column/row ADCs can be disabled or sum values can be ignored by the next processor stage. It is noted again that the read-out of the markings column-wise and row-wise is redundant.

Figure 22:
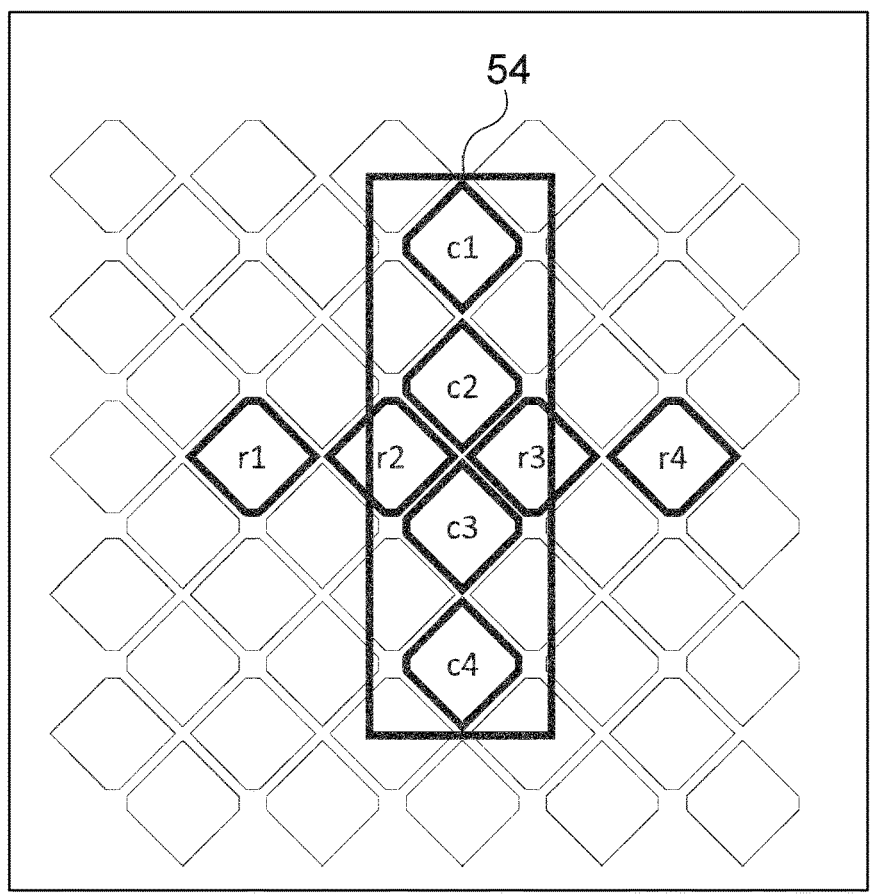
FIG. 22 shows a scheme of reading a marking.
Figure 23:
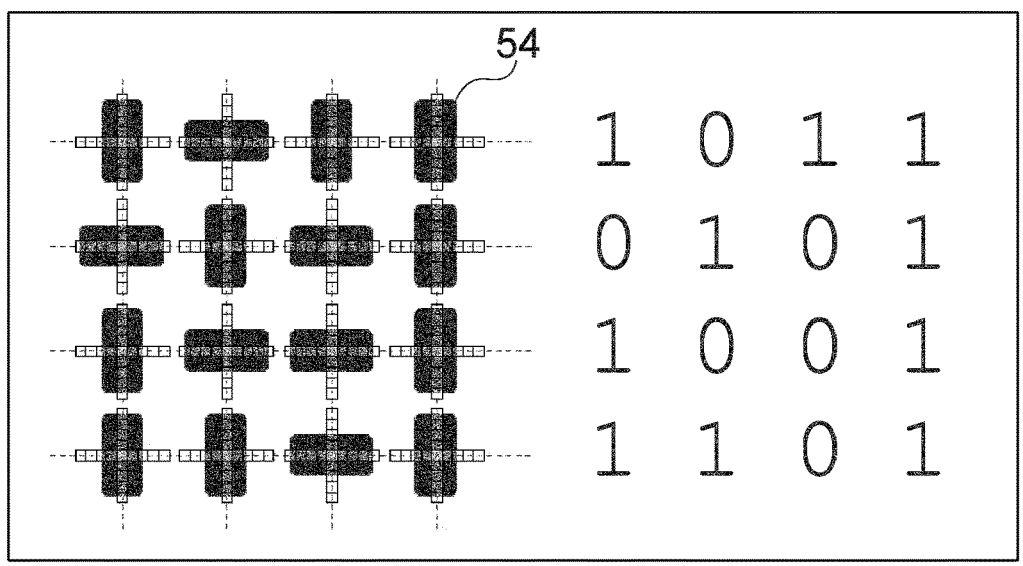
FIG. 23 shows a set of markings and the corresponding coded bits.
Figure 24:
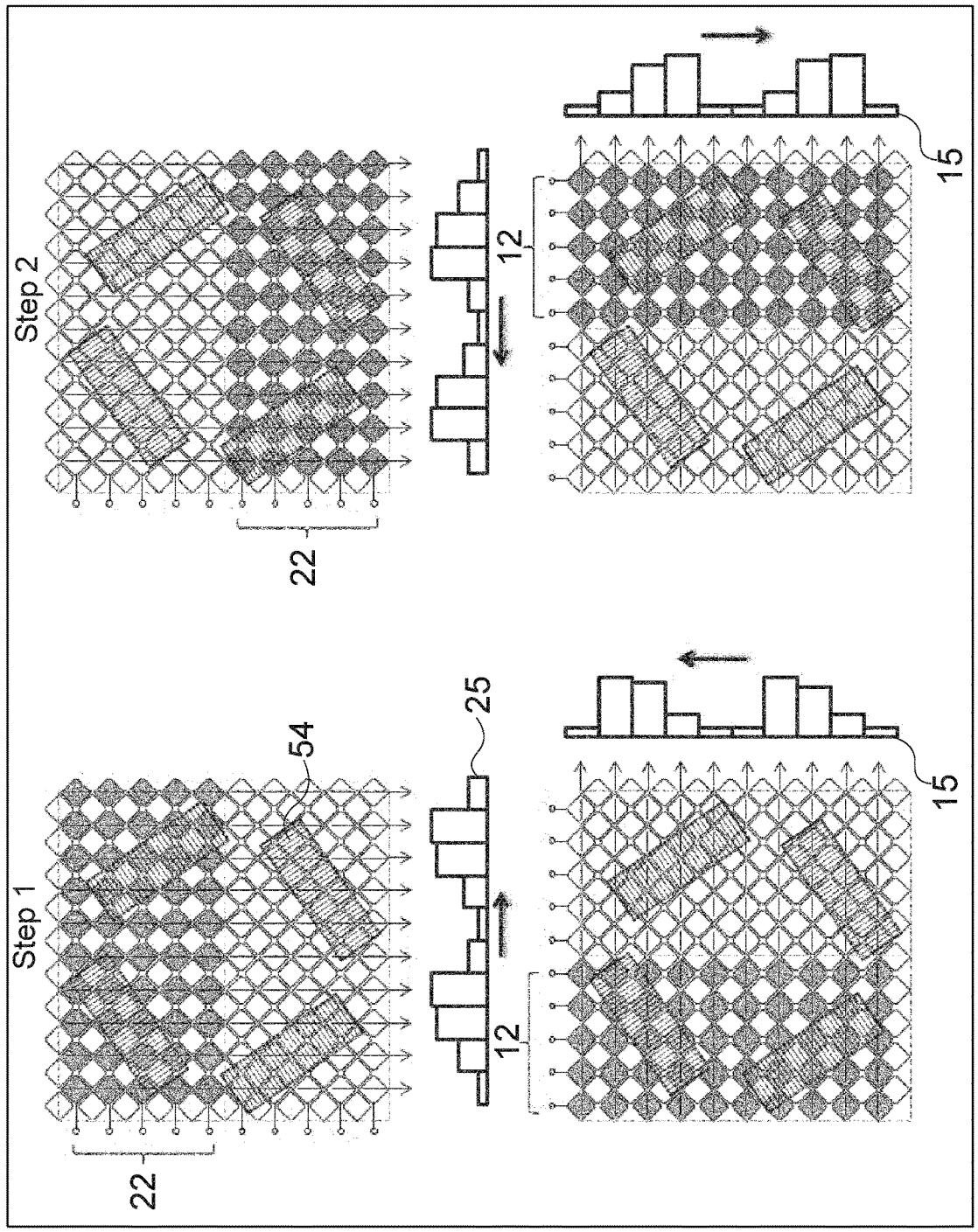
FIG. 24 shows two steps of rotation measurement.

Thus, a positioning code according to FIG. 16 is used, and in the reading steps of the rows and columns of the markings 54, neighboring column pixel 20 rows having a total height and neighboring row pixel 10 columns having a total width being closer to the longitudinal size L of the markings 54 than to their crosswise size W are selected for reading. In this way, as depicted in FIG. 22, the different dimensions of the markings 54 can be detected in a straightforward way. Preferably, in the targeted readout, vertical cross pixels C1-C4 go through (or as close as possible to) the vertical symmetry axis of markings 54, while horizontal cross pixels R1-R4 go through (or as close as possible to) the horizontal symmetry axis of markings 54. If markings 54 are sampled at the cross pixels, orientation can be detected by comparing sums of horizontal cross pixels by sums of vertical cross pixels as follows: bit=sign((c1+c2+c3+c4)−(r1+r2+r3+r4)). The sum of vertical cross pixels c1-c4 and the sum of horizontal cross pixels r1-r4 are preferably read out in one step using the inventive detector device. FIG. 23 shows the set of markings 54 with the targeted readout pixels, and the corresponding bit values.

If the row and column directions of the marking arrangement are not perfectly aligned with the row and column directions of the pixel arrangement, i.e. there is a rotation between the directions, preferably a rotation measurement is carried out in the code pattern position measurement step. The rotation measurement is used to establish the extent of any rotation of the rows and columns of the markings 53, 54 with respect to the rows and columns of the pixels 10, 20. The rotation measurement comprises a first step of selecting for parallel readout a subset of the rows of column pixels 20 and generating a first column-sum vector 25, and simultaneously selecting for parallel readout a subset of the columns of row pixels 10 and generating a second row-sum vector 15, and calculating a first code pattern position on the basis of the first column-sum vector 25 and the first row-sum vector 15. Next, a second step follows, selecting for parallel readout another subset of the rows of column pixels 20 and generating a second column-sum vector 25, and simultaneously selecting for parallel readout another subset of the columns of row pixels 10 and generating a second row-sum vector 15, and calculating a second code pattern position on the basis of the second column-sum vector 25 and the second row-sum vector 15.

The code pattern position is calculated as a function of the first and second code pattern positions obtained in the first and second steps, and the rotation is calculated on the basis of the difference between the first and second code pattern positions, also taking into account the dimensions of the pixel arrangement and the position of rows/cols used in the rotation measurement.

A preferred embodiment is to use half of all rows and columns as subsets, and averaging the obtained position values. However, there is no significance of having exactly 50%, i.e. half of the pixel area. The subsets can be any number between 1 and n. There is no need to have consecutive rows/columns either, e.g. every $2^{nd}$ can be taken. The positions of the subsets is taken into account in the calculation of the position.

By reading out half-columns and half-rows or any other subset of columns and rows in two steps, in addition to the code pattern position, image rotation can be measured very precisely, typically 10 µrad rotation can be detected with a few $mm^2$ pixel array.

Figure 25:
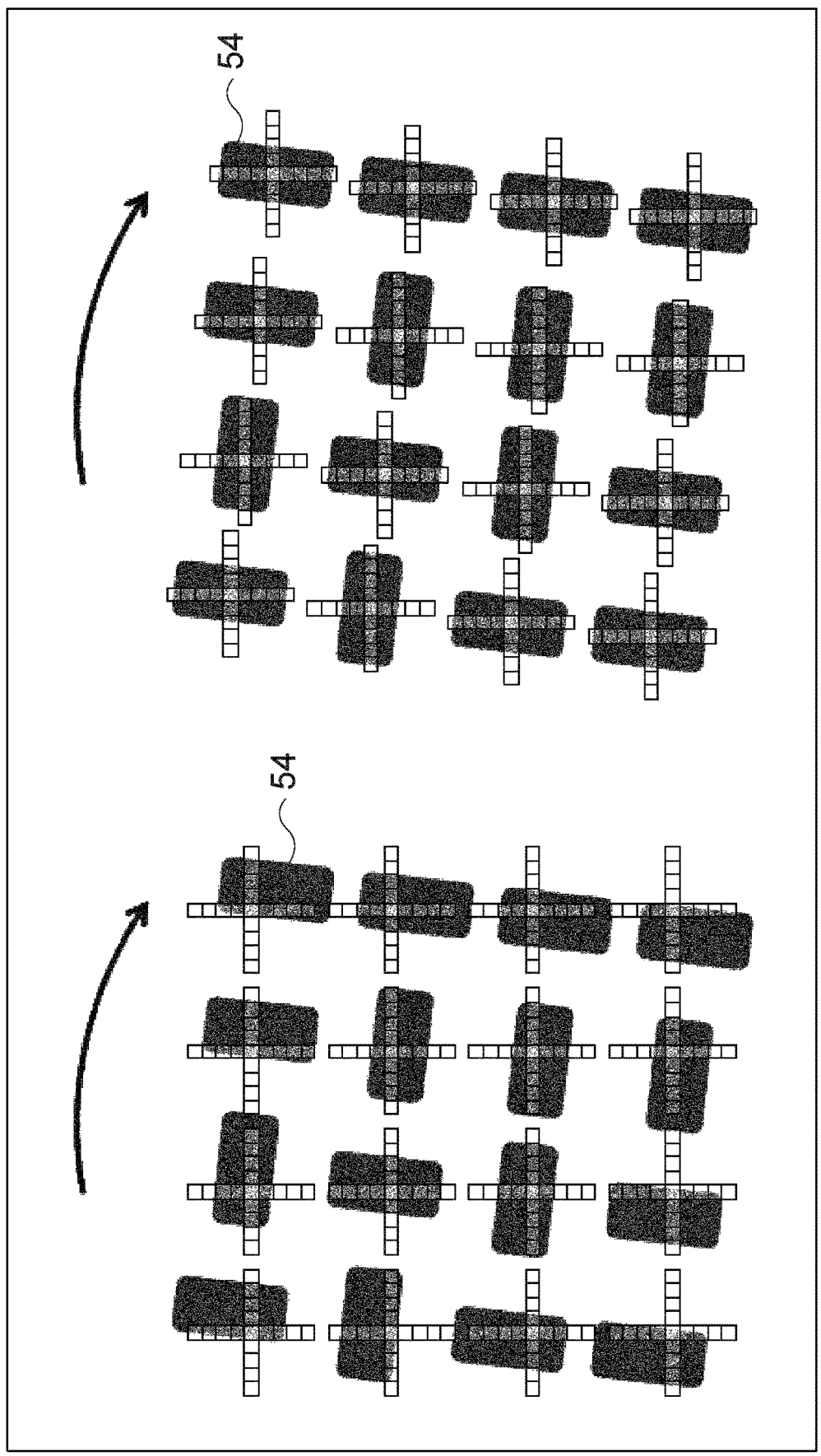
FIG. 25 shows a code pattern that is rotated with respect to the pixel arrangement, in which the reading positions are compensated on the basis of the result of the rotation measurement step.

As depicted in FIG. 25, the rotation calculated can be used in selecting for readout the one or more column pixel 20 rows for reading the rows of markings 54, and in selecting for readout the one or more row pixel 10 columns for reading the columns of markings 54. Namely, the positions of the target pixel sets can be adjusted according to the rotation measured.

On the left side of FIG. 25, a rotated image without compensated cross-pixel-positions is shown. The sampling of the markings 54 is not in the right position, and reading the absolute code is not possible. On the right side of the FIG., a rotated image with compensated cross-pixel-positions is shown. The sampling of the markings is in the right position, and reading the absolute code is possible.

Thus, the invention allows the read-out of a rotated image, e.g. due to a mounting tolerance of the sensor, e.g. when the sensor is rotated around its normal. The invention allows the compensation of not only static image rotation but also dynamic image rotation because rotation angle measurement is intrinsic in the method, e.g. two-step readout or row/column pixels with rotation measurement. This allows cross-pixel position adaptation in every measurement cycle according to the measured rotation. The absolute code read-out can be performed with the rotation-compensated cross pixel positions. Measurement of rotation at each frame and the compensation of the dynamically changing image rotation are necessary in eccentricity compensation, e.g. in Hollow Shaft Encoders.

In case of rotation measurement, a two-step readout is used for the row-sums and column-sums for pattern position measurement and rotation measurement, and additional N steps are used for selective reading out of $N^2$ bits of a 2D absolute code, being in altogether N+2 steps. E.g., reading out 8×8 pattern periods encoding 64-bit absolute code is possible in 10 steps.

Figure 26:
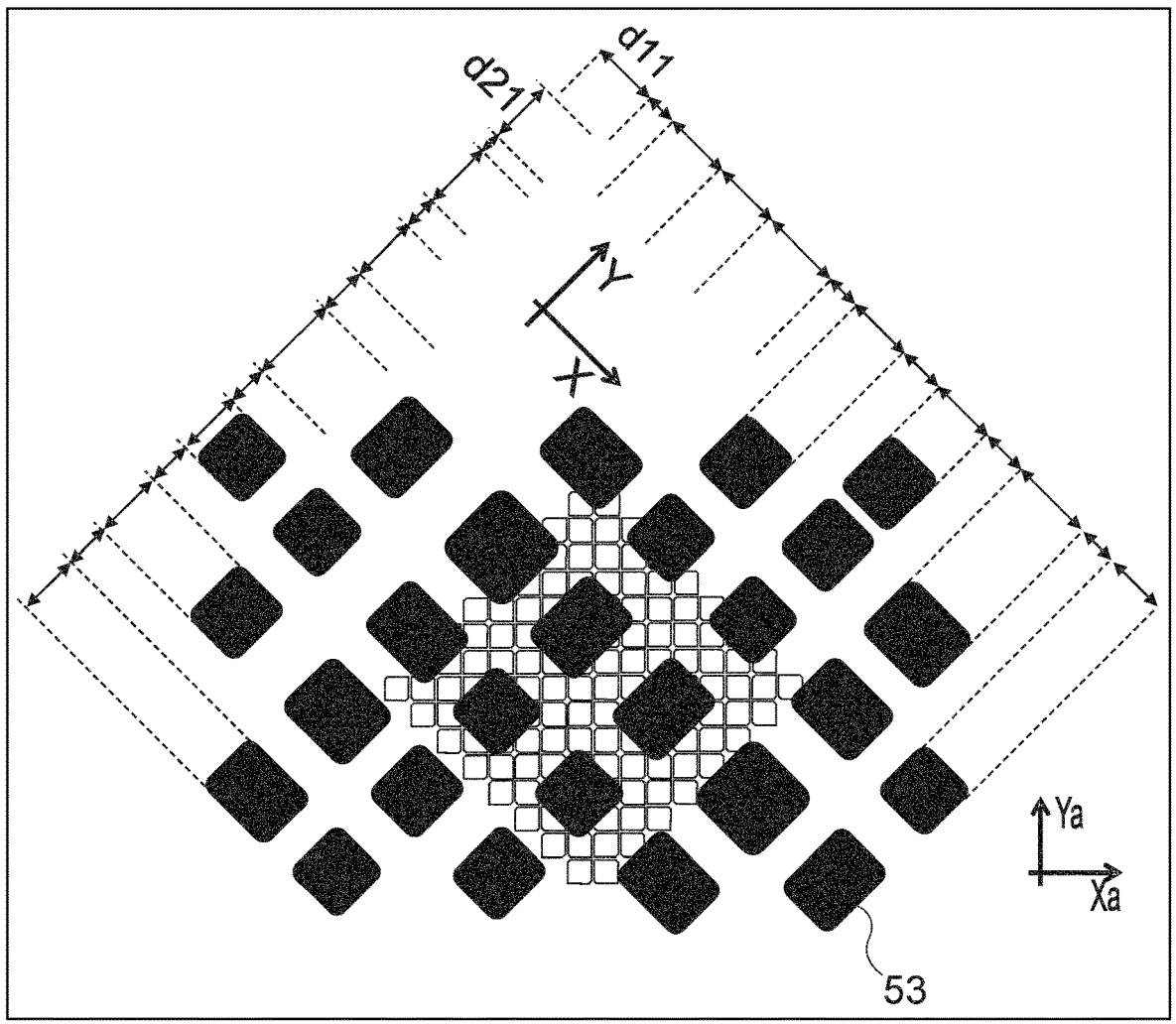
FIG. 26 shows a code sharing layout of a positioning code of FIG. 15.

FIG. 15 shows a case when the X, Y coordinate system of the code is parallel with a Xa, Ya coordinate system of the given application. In this case the absolute position of the two dimensions of the application are independent, Xa is encoded only in the rows, Ya is encoded only in the columns. This not a problem when the scale lengths in the two dimensions are in the same order of magnitude. However, when the scale length in one dimension is much longer than in the other dimension, preferably a "code-sharing" is provided for PPWM codes, as depicted in FIG. 26.

In the code sharing, if a positioning code according to FIG. 15 is used, the two-dimensional code pattern and the detector device is rotated by 45° with respect to a coordinate system of a position-determining application, and the two dimensions Xa, Ya of the absolute position in the position-determining application are encoded by both the rows of markings 53 and the columns of markings 53.

In this case, the absolute position of the two dimensions of the application are not independent, both Xa and Ya positions are encoded by the rows and the columns. In this case, there is a "code-sharing" between the dimensions. Code-sharing has a great significance when the needed scale lengths in the Xa and Ya dimensions are not in the same order of magnitude. As an example, considering a situation where the needed Xa scale length is 1000 m while Ya scale length is 0.1 m, there are 4 orders of magnitude between them. With a pattern period of 1 mm we would need >20-bit code in dimension Xa, and >7-bit code in dimension Ya. With the code-sharing we can distribute the 27-bit code between the two scale dimensions and have a more balanced reading/decoding with 13 and 14-bit code lengths.

It is noted that code sharing is also possible with the positioning codes according to FIGS. 12, 16 and 17, even without a rotation by 45° with respect to the coordinate system of the application.

The rotated code can be folded on an arbitrary trajectory needed for the application, e.g. on a circular code-disc. In this case, in a possible preferred embodiment the rows and columns may follow straight lines. In another embodiment the rows and columns may follow a spiral or logarithmic spiral especially if the code area has a large radial extent. Rows and columns of the pattern can be read by the rows and columns of the detector device, the pixel-arrangement of which is also depicted in FIG. 26.

Figure 27:
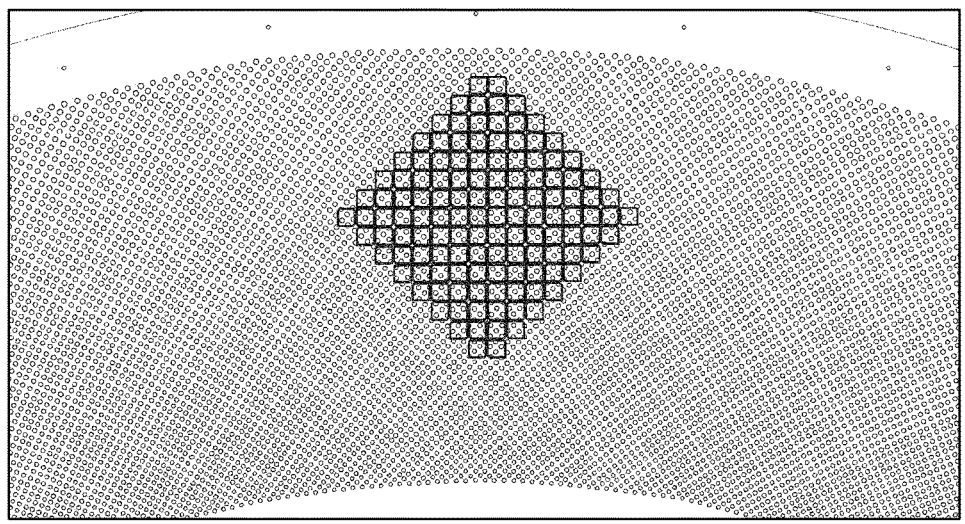
FIG. 27 shows markings arranged on a circular code-disc along two orthogonal logarithmic spirals to obtain for the detector device a local region as close to a square grid as possible.

FIG. 27 shows markings arranged along two orthogonal log spirals to obtain for the detector device a local region as close to a square grid as possible on a circular code-disc, e.g. holes in a metal mask or transparent circles on a non-transparent substrate.

Advantages of the invention and of preferred embodiments of the invention can be summarized as follows:
  Reading out row-sums and column-sums simultaneously is possible.
  Maximum speed, one-step readout of row-sums and column-sums is possible.
  Maximum speed is combined with maximum flexibility read-out.
  n-step read out all individual pixels of the pixel array is still possible.
  50 kHz framerate readout of 2·n·n pixels is possible. It allows e.g. building miniature, low-cost fully flexible pixel-based encoders up to 100 kHz framerate. Prior art image sensors are typically limited to 1 kHz framerate and lack absolute code reading.
  N step readout of N by N period 2D absolute code with up to $N^2$ bit absolute code information is possible for practically any dimension of 1D or 2D scales combined with abundant redundancy for error detection, error correction and high Safety Integrity Level applications.
  Readout of a rotated image is still possible by using rotation measurement and compensation, 10 µrad precise rotation measurement, static and dynamic compensation is possible.

Read-out of higher rotation is possible than with the SOA (Hamamatsu) due to the arbitrary size of col/row summed region (smaller regions tolerate larger rotation).

E.g. even with a miniature, 1 mm² pixel array typically up to 2·12·12=288 bits can be decoded. This allows micrometer to nano-meter precise absolute positioning on 500 million km² surface (the surface of the Earth). Alternatively, it allows micro-meter to nano-meter precise absolute positioning on practically any dimension scale (e.g. >>1 million km). At the same time, it allows very sparse coding, very robust error detection and error correction with code-damage of >50%.

N=64, N²=8192 bits absolute code is also feasible with a 4×4 mm², 512×512 pixel array.

The invention has been described in detail with preferred embodiments depicted in the drawings, however, other embodiments are also possible within the scope of the following claims.

LIST OF REFERENCE SIGNS 10 row pixel
11 row readout wiring
12 column select wiring
13 analog-to-digital converter
14 summing circuit
15 row-sum vector
16 row pixel memory
20 column pixel
21 column readout wiring
22 row select wiring
23 analog-to-digital converter
24 summing circuit
25 column-sum vector
26 column pixel memory
30 sensor element
31 output
32 non-destructive readout circuit
33 readout selection input
34 sides
35 transconductance unit
36 MOSFET
40 address generator and sequencer unit
41 register
42 processing unit
50-54 markings
60-64 spacings
70 center lines
L longitudinal size
W crosswise size

What is claimed is:

1. A detector device comprising:
a two-dimensional arrangement of pixels including row pixels and column pixels and having a row direction along which the pixels are aligned in a plurality of rows, and a column direction along which the pixels are aligned in a plurality of columns, each pixel including:
a sensor element,
an output that outputs an electric signal corresponding to an intensity of radiation incident on the sensor element,
a readout selection input by which the pixel is selected to output the electric signal, and
a non-destructive readout circuit between the sensor element and the output;
a row readout wiring for each row of row pixels, the output of each row pixel in the row of row pixels being selectively couplable only to the row readout wiring for that row of row pixels using the readout selection input of the row pixel, the row readout wiring being configured to transmit a sum of the electric signals from each of the row pixels that is selectively coupled to the row readout wiring;
a column select wiring for each column of row pixels, the column select wiring being coupled to the readout selection input of each row pixel in the column of row pixels;
a column readout wiring for each column of column pixels, the output of each column pixel in the column of column pixels being selectively couplable only to the column readout wiring for that column of column pixels using the readout selection input of the column pixel, the column readout wiring being configured to transmit a sum of the electric signals from each of the column pixels that is selectively coupled to the column readout wiring;
a row select wiring for each row of column pixels, the row select wiring being coupled to the readout selection input of each column pixel in the row of column pixels;
a column and row selecting device connected to the column select wirings and to the row select wirings that is configured to simultaneously select one or more columns of row pixels for row parallel readout, and one or more rows of column pixels for column parallel readout, the column and row selecting device providing simultaneous row parallel and column parallel readouts, with each readout targeting a respective selection of pixels;
a first plurality of analog-to-digital converters configured for row-parallel operation, each of the first plurality of analog-to-digital converters being connected to a respective row readout wiring; and
a second plurality of analog-to-digital converters configured for column-parallel operation, each of the second plurality of analog-to-digital converters being connected to a respective column readout wiring.

2. The detector device of claim 1, wherein the two-dimensional arrangement of pixels has two diagonal directions along which the pixels are diagonally aligned and along which the row pixels and column pixels are alternatingly arranged, and each diagonal direction intersects the row direction, the column direction, and the other diagonal direction.

3. The detector device of claim 2, wherein the pixels have a rhomboid-like shape with sides parallel to the two diagonal directions, and the pixels are arranged with a spacing smaller than a length of the sides of the rhomboid-like shape.

4. The detector device of claim 1, wherein the non-destructive readout circuit includes a transconductance unit having an input connected to the sensor element, and that provides the output of the pixel.

5. The detector device of claim 1, wherein each readout selection input is provided by a gate terminal of a MOSFET, the output of each pixel in the respective row or column of pixels coupled to the readout selection input is coupled to a source of the MOSFET, and a drain of the MOSFET is coupled to the respective row readout wiring or column readout wiring.

6. The detector device of claim 1, wherein the column and row selecting device is a programmable address generator and sequencer unit.

7. The detector device of claim 1, wherein the column and row selecting device comprises writable registers, and data bits written to the registers determine the rows or columns selected by that register.

8. A detector device comprising:
- a two-dimensional arrangement of pixels including row pixels and column pixels and having a row direction along which the pixels are aligned in a plurality of rows, and a column direction along which the pixels are aligned in a plurality of columns, each pixel including:
  - a sensor element,
  - an output that outputs an electric signal corresponding to an intensity of radiation incident on the sensor element, and
  - a readout selection input by which the pixel is selected to output the electric signal;
- a row readout wiring for each row of row pixels, the output of each row pixel in the row of row pixels being selectively couplable only to the row readout wiring for that row of row pixels using the readout selection input of the row pixel, the row readout wiring being configured to transmit a sum of the electric signals from each of the row pixels that is selectively coupled to the row readout wiring;
- a column select wiring for each column of row pixels, the column select wiring being coupled to the readout selection input of each row pixel in the column of row pixels;
- a column readout wiring for each column of column pixels, the output of each column pixel in the column of column pixels being selectively couplable only to the column readout wiring for that column of column pixels using the readout selection input of the column pixel, the column readout wiring being configured to transmit a sum of the electric signals from each of the column pixels that is selectively coupled to the column readout wiring;
- a row select wiring for each row of column pixels, the row select wiring being coupled to the readout selection input of each column pixel in the row of column pixels;
- a column and row selecting device connected to the column select wirings and to the row select wirings that is configured to simultaneously select one or more columns of row pixels for row parallel readout, and one or more rows of column pixels for column parallel readout, the column and row selecting device providing simultaneous row parallel and column parallel readouts, with each readout targeting a respective selection of pixels;
- a first plurality of analog-to-digital converters configured for row-parallel operation, each of the first plurality of analog-to-digital converters being connected to a respective row readout wiring; and
- a second plurality of analog-to-digital converters configured for column-parallel operation, each of the second plurality of analog-to-digital converters being connected to a respective column readout wiring.

9. The detector device of claim 8, wherein the two-dimensional arrangement of pixels has two diagonal directions along which the pixels are diagonally aligned and along which the row pixels and column pixels are alternatingly arranged, and each diagonal direction intersects the row direction, the column direction, and the other diagonal direction.

10. The detector device of claim 8, wherein the pixels have a rhomboid-like shape with sides parallel to the two diagonal directions, and the pixels are arranged with a spacing smaller than a length of the sides of the rhomboid-like shape.

* * * * *